(12) United States Patent
Weng

(10) Patent No.: US 6,353,814 B1
(45) Date of Patent: *Mar. 5, 2002

(54) DEVELOPMENTAL LEARNING MACHINE AND METHOD

(75) Inventor: Juyang Weng, Okemos, MI (US)

(73) Assignee: Michigan State University, East Lansing, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,751

(22) Filed: Oct. 7, 1998

Related U.S. Application Data

(60) Provisional application No. 60/062,655, filed on Oct. 8, 1997.

(51) Int. Cl.[7] .......................... G06F 15/18; G05B 15/00
(52) U.S. Cl. ........................................ 706/12; 700/258
(58) Field of Search ............................ 706/12; 700/258

(56) References Cited

U.S. PATENT DOCUMENTS

| | | | | |
|---|---|---|---|---|
| 4,599,692 A | * | 7/1986 | Tan et al. ...................... | 706/12 |
| 5,586,218 A | * | 12/1996 | Allen ........................... | 706/12 |
| 5,608,843 A | | 3/1997 | Baird, III ..................... | 706/25 |
| 5,983,251 A | | 11/1999 | Martens et al. ............. | 708/203 |
| 6,029,099 A | | 2/2000 | Brown ......................... | 700/245 |

OTHER PUBLICATIONS

Koenig et al., "Unsupervised Learning of Probability Models of Robot Navigation", IEEE Proceedings of the International Conference on Robotics and Automation, Apr. 1996.*

Rylatt et al., "Towards the Autonomous Control of Mobil Robots by Connectionist Experts", IEE 5th International Conference on Artificial Neural Networks, Jul. 1997.*

Simmons et al., "Autonomous Task Control for Mobil Robots", IEEE Proceedings of the 5th International Symposium on Intelligent Control, Sep. 1990.*

Leslie Pack Kaelbing, Michael L. Littman, Andrew W. Moore, "Reinforcement Learning: A Survey," *Journal of Artificial Intelligence Research 4*, May 1996, pp. 237–285.

Kazuo Hirai, Masato Hirose, Yuji Haikawa, and Toru Takenaka, "The Development of Honda Humanoid Robot," May 1998, pp. 1321–1326.

Rodney A. Brooks, "Intelligence Without Reason," Aug. 1991, pp. 569–595.

(List continued on next page.)

*Primary Examiner*—George B. Davis
(74) *Attorney, Agent, or Firm*—Price, Heneveld, Cooper, Dewitt & Litton

(57) ABSTRACT

A machine and method capable of developing intelligent behavior from interaction with its environment directly using the machine's sensors and effectors. The method described is independent of the type of sensors and actuators, or the tasks to be executed, and, therefore, provides a general purpose learner that learns while performing. It senses the world, recalls what is learned, judges what to do and acts according to what it has learned. The machine enables the machine to learn directly from sensory input streams while interacting with the environment, including human teachers. The presented approach enables the system to self-organize its internal representation, and uses a systematic way to automatically build multi-level representation using the Markov random process model. Reward and punishment are combined with sensor-based teaching to develop intelligent behavior.

30 Claims, 8 Drawing Sheets

OTHER PUBLICATIONS

David S. Touretzky and Lisa M. Saksida, "Skinnerbots," from Animals to Animats 4: Proceedings of the Fourth International Conference on Simulation of Adaptive Behavior (SAB96), 1996, pp. 285–294.

Marco Dorigo and Marco Colombetti, "Robot Shaping: Developing Autonomous Agents Through Learning," To Appeal in Artificial Intelligence Journal, Apr. 1993, pp. 1–57.

Jeffrey L. Elman, "Learning and Development in Neural Networks: The Importance of Starting Small," *Cognition* 1993, pp. 1–30.

Thrun, S.B. "Exploration and Model Building in Mobile Robot Domains," IEEE International Conf. On Neural Networks, Mar. 28, 1993, vol. 3, pp. 175–180.

Haigh, Karen Zita and Veloso, Manuela M., "Learning Situation–Dependent Costs: Improving Planning from Probabilistics Robot Execution". Proc. Of the Second International Conference of Autonomous Agents, May 1998, pp. 231–238.

Washington, Richard, "Markov Tracking for Agent Coordination", Proc. Of the Second International Conference on Autonomous Agents, May 1998, pp. 70–77.

Tso, S.K. and Liu, K.P., "Demonstrated Trajectory Selection by Hidden Markov Model", IEEE International Conference on Robotics and Automation, Apr. 1997, vol. 3, Abstract and pp. 2713–2718.

Koenig, Sven and Simmons, Reid G. "Unsupervised Learning of Probabilistics Models for Robot Navigation". IEEE International Conference on Robotics and Automation, Apr. 1996, vol. 3, Abstract and pp. 2301–2308.

Yang, Jie; Xu, Yansheng; and Chen, Chiou S. "Hidden Markov Model Approach to Skill Learning and Its Application to Telerobotics". IEEE Transactions on Robotics and Automation, Oct. 1994, vol. 10, No. 5, Abstract and pp. 621–631.

\* cited by examiner

DEVELOPMENTAL LEARNING MACHINE AND METHOD

CROSS-REFERENCE TO RELATED APPLICATION

This application claims the benefit of U.S. Provisional Application No. 60/062,655 filed on Oct. 8, 1997, the disclosure of which is incorporated herein by reference.

BACKGROUND OF THE INVENTION

The present invention generally relates to artificial intelligence and, more particularly, to a machine capable of developmental learning.

The capability of learning is critical to intelligence. A system without such learning capability generally cannot become more intelligent from experience. Information that is to be learned is generally received through sensors and the actions of an agent are executed by effectors. With respect to computers, rapid advances have been made in speed, storage capacity, performance-to-price ratio, and installation base, which have resulted in the widespread availability of computers. There now exists the possibility for developing reasonably priced multi-modal human-machine communication systems and multi-modal understanding machines. Breakthroughs in machine understanding of multi-modal information, such as video images, speech, language, and various forms of hand-written or printed text, can lead to numerous, long-awaited applications. Artificial intelligence machines have been developed with task-specific programming, which define the rules assigned to handle a particular task. For example, robots can be programmed to move from one location to another location in a specific section of a building. However, machines based on task-specific programming are generally unable to learn complex tasks and adapt to the changing environment.

The capability to understand what is sensed is a key for doing the right action in the right situation. Since humans acquire most of their knowledge from vision, we take vision as an example. It is well-known that vision is extremely difficult, especially for tasks such as recognizing objects in more general settings. For recognition of objects one must cope with a wide variety of variation factors, such as lighting, viewing angle, viewing distance, and object changes (e.g., facial expressions). It is known that learning plays a central role in the development of humans' versatile visual capabilities and it takes place over a long period of time. Human vision appears to be more a process of learning and recalling than relying on an understanding of the physical processes of image formation and object-modeling. Furthermore, recognition by humans takes into account information sources that are not confined to vision. There is a particular need for integrating different sensing modalities for visual recognition. With humans, visual learning takes place while the recognizer is continuously sensing the visual world around it and interacting with the environment through human actions, such that a large amount of visual data that is processed along with other information is learned everyday.

The current mode of training a recognition system requires humans to manually prepare data and class labels to train the system offline. For vision recognition, system training may require a class label for each image. Known trained recognition systems are very limited in scope. For example, if such a system is simply trained to recognize an object as an apple, it cannot handle questions on whether it is a fruit, or whether it is round. Moreover, conventional offline batch training processes cannot produce a system that can continuously improve itself.

In developing an intelligent system, a task-specific paradigm has been used. Typical steps for task-specific systems can be characterized by the following: 1) start with a given task; 2) a human being attempts to analyze the task; 3) the human being derives a task space representation, which may depend on the tool chosen; 4) the human chooses a computational tool and maps the task space representation to the tool; and 5) the parameters of the tool are determined by using one or a combination of known methods. Such known methods include: a) knowledge-based methods that are manually specified using hand-crafted domain knowledge; b) behavior-based methods in subsumption architecture and active vision, c) supervised learning methods which provide estimates using a training procedure, unsupervised learning methods such as clustering techniques, reinforcement learning methods such as Q-learning; and d) search methods, such as genetic search. The known conventional methods are searched for based on a task-specific objective function. This paradigm starts with a task and the following steps depend on the task. Thus, it is referred to as a task-specific paradigm.

Various approaches within this task-specific paradigm have produced impressive results for those tasks whose space is relatively small and relatively clean (or exact), such as machine parts inspection applications in very controlled settings. However, the task-specific approaches face tremendous difficulties for tasks whose space is huge, vague, difficult to fully understand, and difficult to model adequately by hand, such as vision-based recognition of general objects, vision-based autonomous navigation by a mobile robot in unknown indoor and outdoor environments, human-computer interaction via vision, speech, gesture, and human-computer discourse via spoken or written language.

Due to the task-specific programming, conventional approaches are unable to provide a general-purpose learning capability that develops over time. The process of learning more skills based on learned skills is called developmental learning. A fundamental way to address these very challenging issues is to investigate how to automate the training process for a wide variety of cognitive and behavioral tasks, including recognition, information fusion, decision making and action generation. It is therefore desirable to realize intelligent systems with developmental learning that sense and act.

SUMMARY OF THE INVENTION

Accordingly, it is therefore an aspect of the present invention to provide for a machine and method that is capable of developmental learning from its environment without requiring task-specific programming. The machine receives various sensor inputs, organizes the information, and provides output control signals to effectors. The method is independent of the task to be executed and is, therefore, a general-purpose learner that learns while performing. The method is general in that virtually any sensors and effectors can be used for each machine, and potentially any cognitive and behavioral capability can be learned. Which sensors and effectors are used will affect the machine's sensing and action capabilities. The machine can learn directly from the sensory input streams without requiring humans to segment input streams by continuously interacting with the environment, including interaction with a teacher. The system automatically builds multiple level representations using a generalized Markov random process model. Reward and punishment are also applied to the machine in the context of sensor-based teaching to develop intelligent behavior.

The machine includes one or more sensors for sensing an environment of the machine, one or more effectors for acting on one or more objects in the environment, a sensor-dedicated level builder having one or more level building elements, and a confidence accumulator. The machine and method of the present invention automatically develops learning capability by sensing an environment with the sensors, inputting successive frames of signal information into one or more sensor-edicated level builders, producing action signals with the sensor-dedicated level builders, each of the action signals having a relative probability. The method further includes inputting the action signals to the confidence accumulator, determining a most probable action based on the probability of the action signals received by the confidence accumulator, and producing action controlled signals to control the effectors in response to the determined action signals. The method advantageously learns while performing. According to a further embodiment of the present invention, the sensor-dedicated level builders produce state output signals which are integrated to generate integrated action signals that are input to the confidence accumulator. In addition, an average of the action signals could be computed and used to produce the action control signals. To conserve on memory, low priority action may be forgotten.

This invention enables developmental learning, including autonomous learning which is a special mode of developmental learning. The basic requirement of developmental learning is that the machine must be able to learn new tasks of unconstrained domains and new aspects of each complex task without a need for reprogramming (by humans). These new tasks that the system can learn are not confined to those imaginable at the time of machine construction. Therefore, the method of the machine must be so designed that it is not task-specific. Since the sensors and effectors of the machine are determined at the time of machine construction, the method is designed to fit the sensors and effectors of each particular machine. Thus, the method is sensor and effector specific.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 10a illustrates the decision boundary when attention mechanism selects $X_1$ only; FIG. 10b illustrates the decision boundary of the nearest neighbor rule when attention mechanism selects both $X_1$ and $X_2$; FIG. 10c illustrates misclassified areas in FIG. 10a; FIG. 10d illustrates misclassified areas in FIG. 10b;

DETAILED DESCRIPTION OF THE PREFERRED EMBODIMENTS

Developing Learning

Figure 1:
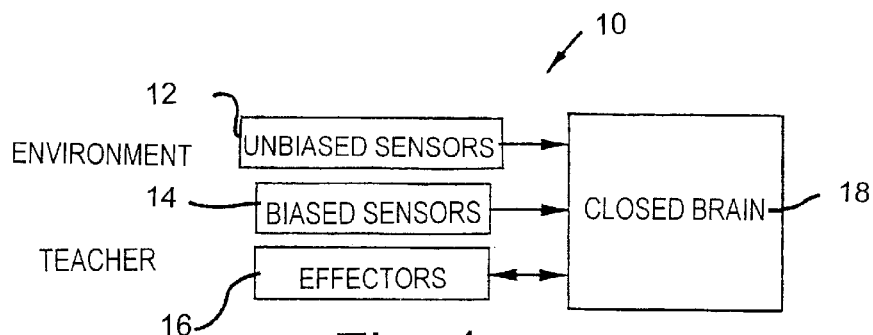
FIG. 1 is a block diagram illustrating the relationship between the developmental learning machine and its environment.

A developmental learning machine, particularly the self-organizing autonomous incremental learner (SAIL) machine as a particular embodiment disclosed herein, is provided to interact with humans in an environment and to learn to communicate with humans through sensors and effectors. The developmental learning machine and method provides general-purpose learning which does not require programming at the task-level and allows the machine to intimately interact with its environment to learn more and more tasks. In developmental learning, the learner has two types of channels with its environment, sensors and effectors. The learner learns from the environment by sensing the environment through its sensors and acting on the environment and itself through its effectors. The learning mode must be the same as the performance mode, with no distinction. The teacher is a part of the environment. The environment can enforce an action of the effectors on the learner. Rewards are preferably received from biased sensors at early stages of machine development. Later on, rewards can be received from all sensors since the machine can develop preference for all sensors. Some sensors and effectors of the machine can sense and act on the machine itself, respectively.

Human teachers, as a part of the system's environment, can affect how the system learns. For example, the human teachers can show different object examples, verbally state the characteristics of the object, and then ask questions immediately about the characteristics of the object. The human teacher may encourage the system to act properly using different rewards at appropriate times. Actions can be imposed by a human teacher to directly enforce the correct action to execute, similar to action and delivery of rewards that occurs in human learning. For example, manipulating a child's hand to hold a pen when teaching a child how to use a pen. In that case, rewards to a human child can be food, a good test score, etc.

A developmental learning method is difficult to design, and the most difficult part is the requirement that no reprogramming is allowed when the machine learns more tasks, including tasks that the system designer cannot imagine at the time of system design. Thus, the method must be applicable to an open number of tasks that the machine can execute with its sensors and effectors. Another important distinction of the machine of the present invention is that learning does not use a separate stage of system development. The machine learns while performing. When the machine learns new things, it is performing using its learned skills. When it is performing, the machine also learns from new cases since no two cases are exactly the same based on sensory signals. This concurrency of learning and performance is a very fundamental difference from conventional machine learning methods. With a machine that can perform developmental learning, the following goals become possible: the learning mechanism must be able to deal with the full generality of the performance environment; and the machine must be able to improve while performing real tasks. Developmental learning is a new type of learning raised here as an explicit goal for a machine.

The Developing Approach

The developmental learning machine of the present invention employs a new developmental approach that requires a drastic departure from current known task-specific paradigm approaches. The developmental approach requires domain-extensibility, in that the machine agent must be able to learn new tasks in new domains without the need for reprogramming. In addition, the developmental approach requires relieving the programmer from task analysis, in that it does not require the programmer to analyze every task that the agent must learn. Also required by the developmental approach is the freedom from a hand-crafted task model, in that it does not require the programmer to give a task space representation and to establish the mapping from the task space to the chosen computational tool. Further, the developmental approach requires a developmental mechanism in that it requires a developmental learning mechanism implemented by a developmental algorithm. Finally, the developmental approaches requires a "living" machine for cognitive and behavioral development and, that after its "birth," the developmental learning algorithm runs daily, thereby enabling the machine to learn continuously through interactions with the environment using its available sensors and effectors.

The developmental algorithm may be defined as follows: a developmental algorithm is an algorithm that automates the development of an agent. The developmental algorithm starts to run at the birth time of the agent. While the developmental algorithm is running, the agent develops by interacting with its environment through its sensors and effectors. A single developmental algorithm is responsible for the entire life span of the agent.

Before discussing how to enable the machine to develop automatically, the developmental approach is contrasted with other existing approaches to artificial intelligence as follows. The following table outlines the major characteristics of several approaches to constructing intelligent systems:

TABLE 1

| Approach | Species Architecture | World Knowledge | System Behavior | Task-Specific |
|---|---|---|---|---|
| Knowledge-based | Programming | Manual modeling | Manual modeling | Yes |
| Behavior-based | Programming | Avoid modeling | Manual modeling | Yes |
| Learning-base | Programming | Treatment varies | Special-purpose learning | Yes |
| Evolutionary | Genetic search | Treatment varies | Genetic search | Yes |
| Developmental | Programming | Avoid modeling | General-purpose learning | No |

As provided in Table 1, the developmental approach of the present invention stands on the middle ground between two extremes; at one extreme, the agent is totally hand-coded by human beings (the knowledge-based approach), and at the other extreme the agent is constructed using genetic search (the evolutionary approach). The knowledge-based approach requires a large amount of human domain knowledge, and thus is the most domain specific and ad hoc. The evolutionary approach requires the least amount of human knowledge, but requires a tremendous amount of cost in time and computation. The developmental approach of the present invention relieves humans from explicit design of any task-specific representation and knowledge, system behavior representation, behavior modules and their interactions. However, the developmental algorithms supplied at "birth" must be designed by human beings. In addition, the developmental approach of the present invention is not task-specific, unlike other known approaches. Instead, the developmental approach aims to build an efficient general-purpose learner.

The machine agent has several sensors. At the time of its "birth," its sensors fall into one of two categories, biased and unbiased. If the agent has a predefined (innate) preference for the signal from a sensor, the sensor is called biased. Otherwise, it is an unbiased sensor, although a preference can be developed by the agent later through its learning. This can be contrasted to a human being having an innate preference to sweet and bitter taste through its taste sensor, but not having a strong preference to visual images of furniture items. By definition, the extroceptive, proprioceptive, and interoceptive sensors are, respectively, those that sense stimuli from external environment (e.g., visual), relative position of internal control (e.g., arm position), and internal events (e.g., internal clock).

The operational mode of the developmental algorithm of the present invention is very important to the success of development. To understand the operational mode of development, the following provides a computational definition of automated interactive learning for the machine agent. Automated interactive learning is a practical form of developmental learning. The machine agent (M) conducts automated interactive learning at discrete time instances if after its "birth" the following conditions are met for all the time instances t=0, 1, 2, . . . : (I) Agent M has a number of sensors (biased or unbiased, extroceptive, proprioceptive, or interoceptive), whose signal at time t is collectively denoted by x(t); (II) Agent M has a number of effectors, whose control signal at time t is collectively denoted by a(t), (the effectors include extro-effectors, e.g., those acting on the external world and intero-effectors, e.g., those acting on an internal mechanism, such as attention); (I) Agent M has a "brain" denoted by b(t) at time t; (IV) At each time t, the time-varying state-update function $f_t$ updates the "brain" based on sensory input x(t) and the current "brain" b(t):

$$b(t+1)=f_t(b(t),x(t)) \quad \text{(Eq. 1)}$$

and the action-generation function $g_t$ generates the effector control signal based on the updated brain $b(t+1)$:

$$a(t+1)=g_t(b(t+1)) \quad \text{(Eq. 2)}$$

where $a(t+1)$ can be a part of the next sensory input $x(t+1)$; and (V) The "brain" of agent M is closed in that after the birth (the first operation), $b(t)$ cannot be altered directly by human teachers for teaching purposes. It can only be updated according to equation (1).

The design for a "brain" representation $b(t)$, the time-varying state-update function $f_t$, and the action-generation function $g_t$, determines the automated interactive learning mechanism as well as the maturation schedule. It is worth noting that t can be dropped from $f_t$ and $g_t$ in the definition since $b(t)$ is not restricted in the definition. For example, any time varying function $f_t(b(t), x(t))$ can be represented by a time invariant function $f(x(t), b(t), t)$, and $(b(t), t)$ can be defined as the "brain." The definition for continuous time is analogous.

From the definition we can see that automated interactive learning does not require two separate learning and performance phases. The machine agent learns while performing. This is important for continuous, open-ended cognitive and behavioral development. Automated interactive learning does not require humans to provide edited and segmented sensory input (i.e., no need to spoon-feed data). The system accepts a continuous, unsegmented sensory input stream on-line.

Architecture of the Developmental Learning Machine

The architecture of the developmental learning machine will now be described hereinafter. Referring to FIG. 1, a diagram giving an overview of the architecture of the developmental learning machine is illustrated therein. The developmental learning machine conceptually can be considered to include unbiased sensors 12, biased sensors 14, and effectors 16, which interact with the machine agent that is conceptually shown as a closed brain 18. Accordingly, the learning agent has two types of channels to interact with the environment, including the sensors and effectors. The double arrow connection between the effectors 16 and brain 18 indicates the actions imposed by the environment can be sensed by the brain 18 through sensors dedicated to the effectors 16. Rewards can be sensed through biased sensors at early developmental stages. Rewards can also be sensed through unbiased sensors at later developmental stages since the agent may develop preference to the signals from the unbiased sensors.

Figure 2:
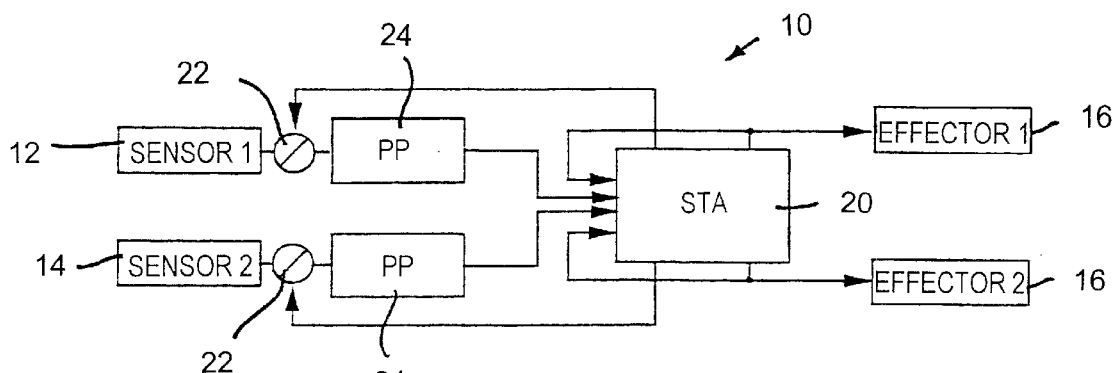
FIG. 2 is a block diagram illustrating the architecture of the developmental learning machine of the present invention.

Referring to FIG. 2, the architecture of the developmental learning machine 10 is shown with more particular detail. Developmental learning machine 10 further includes an attention selector 22 associated with each sensor, and a preprocessor 24 also associated with each sensor for processing the sensed information. In addition, machine 10 has a spatiotemporal associator (STA) 20, for further processing signals from the sensors and for also generating action to effectors 16. The attention selector 22 selects a part of the components of the sensory vector. For example, if the sensor is a camera, the attention selector 22 selects the pixels that fall in a circle of a radius centered at a pixel defined at a certain row and column. The preprocessor 24 processes the input sensory vector selected by the attention selector 22. For example, the preprocessor 24, when used for a camera may normalize the contrast and the average intensity of the input vector selected by the attention selector 22. The spatiotemporal associator 20 may also contain attention selectors for each sensor. The difference is that the attention selector 22 is prior to preprocessing and attention selectors in the spatiotemporal associator are provided after the preprocessing.

Figure 3:
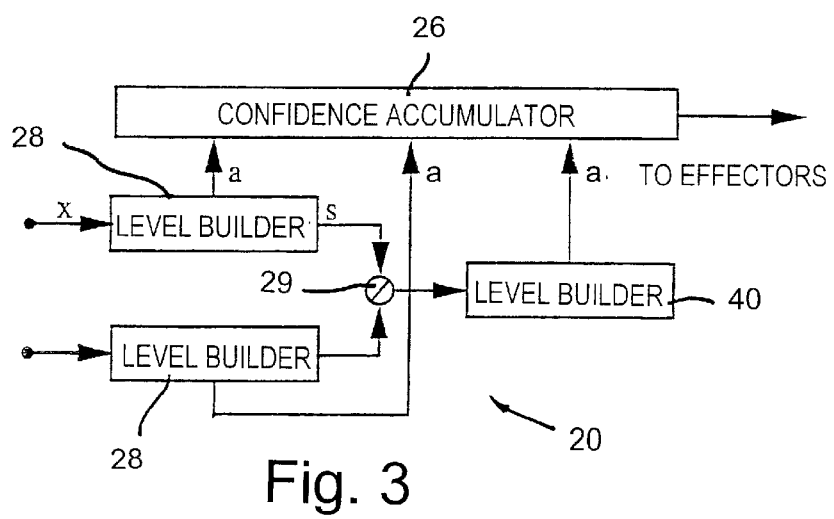
FIG. 3 is a block diagram further illustrating the architecture of the developmental learning machine according to the present invention.

Referring to FIG. 3, the architecture for the spatiotemporal associator 20 is shown therein. The spatiotemporal associator 20 accepts a number of input channels each corresponding to a sensor, either extro-sensor or intero-sensor, and outputs actions to effectors. Each sensor may have a dedicated level builder 28 where its output state s is fed into the next level builder for multi-sensory integration. The spatiotemporal associator 20 includes a confidence accumulator 26 which accumulates confidence from every action source and computes the composite confidence to determine its output action (a). As shown, each of the two sensors has a level builder 28 prior to being integrated. Additional sensors can be integrated in a similar way automatically.

As mentioned, each sensor has a sensor-edicated level builder 28. The output state (s) of the sensor-dedicated level builders 28 are fed into a sensor-integration level builder 40 via action selector 29. Each sensor-dedicated level builder 28 performs sensor-specific processing so that very similar inputs are represented by their centers to save memory. Typically, the sensor-dedicated level builder 28 has fewer levels than the sensor-integration level builder 40. Accordingly, each sensor-dedicated level builder 28 accepts an input action (x) and outputs action (a) with a confidence measure to the confidence accumulator 26, and further outputs the state (s) to an action selector 29 which is input to the sensor-integration level builder 40.

It should be appreciated that more than two sensors can be integrated in a similar fashion. For example, the output of three sensor-dedicated level builders 28 can be integrated by a single sensor integration level builder 40. A group of sensors whose functionality are similar can be integrated by a sensor-integration level builder 40 before being integrated with other sensor groups. For example, all the sensors from a robot arm can form such a sensor group. Some simple sensor (e.g., a biased sensor for receiving reward) may not need a separate sensor-dedicated level builder of its own.

There are two basic ways of integrating multiple sensors. One way is to let the developmental algorithm automatically form the modularity of the level builders. For example, each sensor has no dedicated level builder and a single level builder is used directly for integration of both sensors as shown in FIG. 3. This single level builder will automatically form modularity in its state space. The other way of integrating multiple sensors is to design the modularity based on the human's designer's understanding of the nature of each sensor and the relationships between the sensors and the effectors. In general, the former way allows better adaptation to the environment, while the latter way may shorten the learning time needed in the development if the human modularity design is appropriate for the environment in which a particular agent operates. In the current embodiment as tested, the sensory-specific level builder 28 is limited to having a single level and the biased sensor has no level builder due to its simplicity; however, the design choice can be changed for other more complex agents without departing from the teachings of the present invention.

Figure 4:
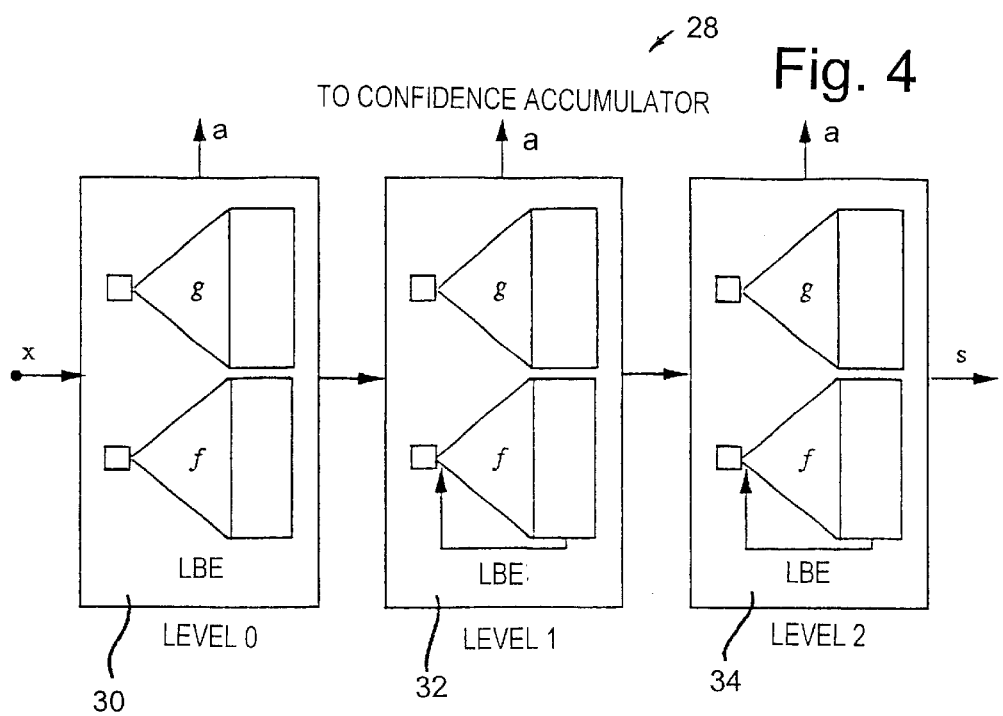
FIG. 4 is a block diagram illustrating the architecture of the sensor-dedicated level builder employed in the developmental learning machine.

The architecture of the level builder 28 is further shown in FIG. 4. Each level of the level builder 28 corresponds to a level-building element (LBE), including level-building elements 30, 32, and 34, which represent level 0, level 1, and level 2, respectively. The input to the level builder 28 is the sensory input denoted by x, while the output from the level builder 28 is the state at the highest level denoted by state s. Each of level building elements 30, 32, and 34 outputs an action vector a having a confidence level to be processed by the confidence accumulator 26.

The level builder 28 has several levels as shown in FIG. 4. For a sensor-dedicated level builder 28, the number of levels is fixed. The sensor-integration level builders 40 preferably have a fixed number of levels, unless it is the last sensor-integration level builder. Each level also has a state s, representing the context. The higher the level, the longer temporal context its state contains. The last level builder preferably has no state output. Each of the other level builders has two parts; one is the state of the current highest level, and the other is the current action with the estimated confidence.

The developmental learning machine of the present invention uses level-based architecture corresponding to temporal context, in contrast to domain knowledge hierarchy or system behavior hierarchy used by conventional approaches. In the developmental learning machine, the global state s of the "brain" b(it) at any time t is represented distributedly by states at different levels: $s=(s_0, s_1, s_2, \ldots, s_L)$, where $s_i$, $i=0, 1, 2, \ldots L$, represents the state at level i. The current total number of levels L is determined automatically based on the maturation schedule of the system which depends on the experience as well as the virtual age of the system. Level 0 is context free, to model stimulus-response reflex. Starting from level 1, temporal context is incorporated. The higher the level i, the more temporal context each state at level i represents.

The basic mechanism of the level-building elements for each level is basically the same. The differences between levels is explained herein. The level arrangement of the present invention employs levels that are not defined in the sense of behavior hierarchy or knowledge hierarchy, but rather in the extent of temporal context that is recorded. Each level in the present invention can incorporate knowledge and behavior as long as each level has a similar amount of temporal context. In addition, mediation among many behaviors, both within each level and among different levels, are automatically learned in the present invention, in contrast to being programmed. Such mediation is extremely difficult to hand-craft and program when the number of behaviors becomes large. To simplify the discussion, the following description will initially concentrate on a single level, and later will discuss the issues of integrating different levels.

The developmental learning algorithm employed in connection with the learning machine of the present invention automatically generates states without being given any task. Referring back to FIG. 3, consider level 1, in which part of the brain state at this level is denoted by a state vector s(t). If s(t) is considered a random process, equations (1) and (2) are closely related to the formulations for Markov decision processes, or hidden Markov models if the action part is omitted. The state transition function $f$ and the decision function g can be based on probability distributions provided below to take into account the uncertainty in states, observations and actions:

$$\text{Prob}(s(t+1)=s'|s(t)=s,x(t)=x)$$

and $$\text{Prob}(a(t+1)=a|s(t+1)=s'),$$

where Prob ( ) denotes the probability.

A state s is defined to be a vector in a high dimensional space S that is determined by the system's sensors and effectors. Thus, the state has an explicit representation. S must contain all the possible sensory inputs $x \in \chi$. In contrast to existing Markov decision process methods, the present invention requires that the state records the temporal context. The algorithm automatically forms a new state $s \in S$ from several sources whose total dimensionality is larger than that of S. Therefore, it uses a (sensor-dependent) re-sampling operator to form the state. The design of the re-sampling operator needs to take into account: (a) the nature of the signal; and (b) the desired temporal span in the state vector. Depending on the source of information from which the state is formed, the re-sampling operator can be performed in space S, in time, or in space-time. We discuss space-re-sampling in the following.

Suppose that space Z is one of the sources to form a new state (recursively). First, consider a re-sampling operator R which reduces the subsampling rate of the space Z by a factor of two. In other words, if $z=(z_1, z_2, \ldots, z_{2m}) \in Z$, $R(z)=(z_1', z_2', \ldots, z_m')$, where $z_i'=(z_{2i-1}+z_{2i})/2, i=1, 2, \ldots, m$. This is 1-D re-sampling for a single z of 1-D nature. If the source z is an image, the re-sampling should take into account the 2-D nature. In general, a non-integer reduction ratio may also be necessary. The re-sampling operator does not have to be uniform for every z component. In principle, the re-sampling operator will treat each source of information separately and it should not change the topology of the source, unless the topology cannot be represented by the resulting resolution.

At level 1, the new state can be directly defined by a simplified function $f$ in Eq. (1) as $$s(t+1)=f_t(s(t),x(t))=(R(s(t)),x(t)). \tag{Eq. 3}$$

Figure 5:
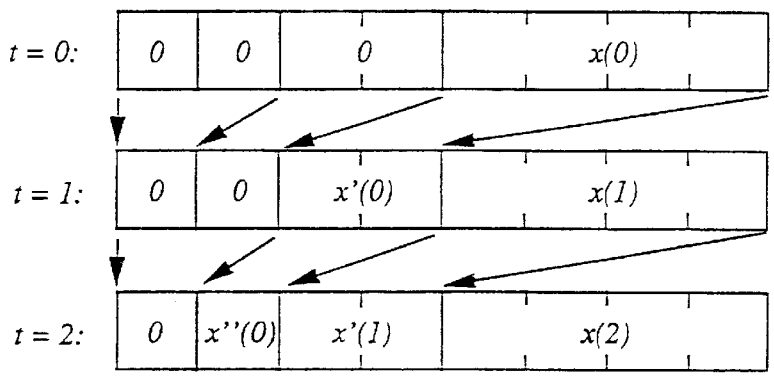
FIG. 5 is a block diagram illustrating how states are formed over time with the developmental learning machine.

In other words, the next state s(t+1) keeps the re-sampling version of the current state s(t) and all the information of sensory input x(t). Given sensory inputs x(0), x(1), . . . , the simplified $f$ in Eq. 3 defines a trajectory of states s(1)=(0, x(0)), s(2)=(R(s(1)), x(1)) and so on. FIG. 5 provides an illustration of how the state is formed through tine t=0, 1, 2, for sensory inputs x(0), x(1), x(2). The 2:1 re-sampling rate used in FIG. 5 reduces the resolution by a factor of 2 through time. Thus, if the dimensionality of x is d, roughly $\log_2(d)$ frames are kept in the state s. The earlier a frame x(t) is in a state s, the lower its resolution. If x(t) of a particular sensing modality has a low dimensionality, but a longer history is necessary in the state representation, a slower resolution reduction rate is necessary. For example, 3:2 or 5:3 ratios can be used. Alternatively, resolution reduction is done for certain sections in a state. The state transition function $f$ does not have to perform identity mapping as in Eq. (3). Instead, it is preferably the result of state clustering, merging and forgetting.

The input x(t) is what is selected by attention selection and its other actions. The formation of s(t) depends on the maturity of the agent. Thus, the state representation $s(t+1)=f_t(s(t), x(t))$ is a time-discounted, attention-selected, maturity-dependent context. This context is not equal to simply a section of input sequence cut and subsampled by a time-domain window.

Figure 6:
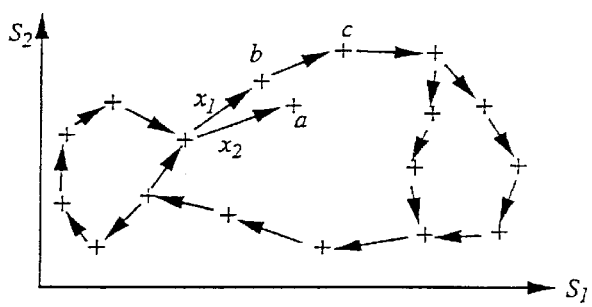
FIG. 6 illustrates an extending trajectory in space (s) for states.

After the power of the machine agent M is turned on for a period of time, such as a day, the states s(0), s(1), s(2), . . . result in an ever extending trajectory in the space S as shown in FIG. 6, until the power is turned off. In principle, the "brain" can memorize all the states s(t) that have occurred and $f$ records all of the state transitions. State clustering is employed to control the number of states in memory.

A vector space with a defined norm (distance metric) is called a formed space. The formed state space representation facilitates the following important functionalities: (1) states can be generated automatically online as they are being recorded, avoiding the problems of symbolic states that must be manually bound to a meaning of a task; (2) the high-dimensional state space keeps the richness of the meaning of the state, although the meaning is implicit; (3) generalization across states can be realized, as illustrated in FIG. 6, in which the predicted states and the action from a newly generated state a can be determined from those of the nearest neighbor state b in S; (4) the distance metric in S makes it possible to access a huge number of states using a tree-based function approximator for real-time operation, and; (5) state clustering and forgetting can be applied.

As set forth in equations (1) and (2) above, four components of the AA-learning agent are identified for each time instance t:

$$(a(t+1), s(t+1), s(t), x(t)) \qquad \text{(Eq. 4)}$$

The aforementioned four components of the agent involve three entities which include: action, state, and sensor. Depending on whether the action is imposed or not, the learning can be classified into action-imposed learning and action-autonomous learning. Action-imposed learning is such that the extro-effector part of a(t+1) is supplied by the trainer. For example, hand-in-hand learning can be used by a human adult to teach a child how to use a pen. Otherwise, the learning is action-autonomous learning.

Depending on whether the state s(t) is imposed or not, learning can be classified into state-imposed and state-autonomous. The state-imposed learning is such that s(t) and s(t+1) are set by the human trainer during the learning. If a learning method requires a task-specific representation, the representation typically determines the meaning of states and thus the learning must use state-imposed learning. The developmental learning method is state-autonomous learning, and as such, the state of the system is determined by the developmental algorithm autonomously. If the state of the system is not directly readable to the teacher, the learning is state-readable. Otherwise, it is state-unreadable.

Depending on whether the unbiased sensor is used or not, the learning can be classified into reinforcement learning and communicative learning. Reinforcement learning is such that a biased sensor is used to reinforce or punish certain responses from the machine agent. Communicative learning is such that only unbiased sensors are used in learning. This requires that the agent correctly interpret the signal from unbiased sensors, as an instruction for action, an encouragement, an explanation, etc. In comparison, learning by a human adult is mostly conducted in the communicative learning mode.

The learning type can be represented by a 3-tuple (A, S, X), where $A \in \{i, a\}$ denotes if action is imposed or autonomous, $S \in \{i, a\}$ denotes the state is imposed or autonomous, and $X \in \{r, c\}$ denotes the biased sensor is used or not. There are eight different 3-tuples, representing a total of eight different learning types. Thus, there are four types of developmental learning: type (1) action-imposed and reinforcement; type (2) action-imposed and communicative; type (3) action-autonomous and reinforcement; and type (4) action-autonomous and communicative.

Figure 7:
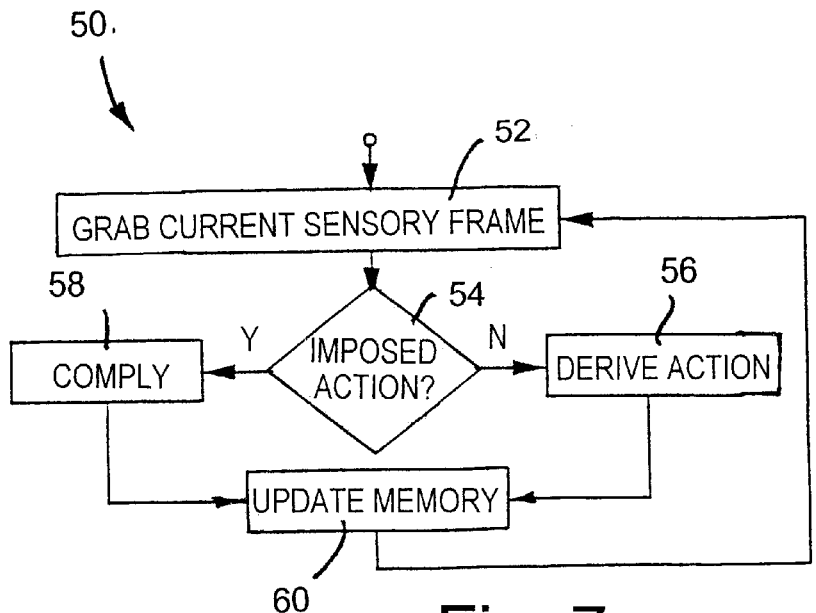
FIG. 7 is a flow diagram illustrating a methodology of developmental learning of a machine according to the present invention.

Referring to FIG. 7, a developmental learning methodology 50 is shown for performing autonomous developmental learning with the developmental learning machine of the present invention. The autonomous learning methodology 50, for the example provided, includes the step of grabbing the current sensory frame in step 52. This may include grabbing the current video frame when a video image is being sensed. With the current sensory frame, developmental learning methodology 50 checks for an imposed action in step 54. If any action is imposed, developmental learning methodology 50 complies with the action in step 58 and proceeds to update memory in step 60. Otherwise, if no action is imposed, developmental learning method 50 proceeds to derive the action in step 56, and thereafter updates memory in step 60. Upon completing and updating the memory in step 60, the developmental learning methodology 50 proceeds back to step 52 to grab the next sensory frame. It should be appreciated that the autonomous developmental learning methodology 50 operates continuously and allows the developmental learning machine to learn while performing.

If the trainer imposes an action on an effector at any time, such as through a joystick, the system performs action-imposed learning for that effector. Otherwise, the system performs action-autonomous learning, during which reinforcement learning or communicative learning is used. To start training using the developmental learning machine, most of the learning activities are action-imposed with simultaneous positive reinforcement signals applied to the biased sensor to allow the agent to learn some basic behaviors, such as those that are probably innate in biological organisms.

To aid in understanding, we first describe an oversimplified and thus inefficient and weak version of action-imposed learning. Suppose that the machine agent M has recorded in memory $B=\{(x(i),s(i),a(i))|i=0, 1, \ldots, t-1\} \cup \{s(t), a(t)\}$. Note that s(t),a(t) are the result from sensory input x(t−1). According to the flow diagram in FIG. 7, agent M grabs the current sensory frame x(t). Then, agent M computes the next state s(t+1) using equation (3). If an action is imposed, a(t+1) is supplied by a human being (or environment) and thus agent M complies by sending a(t+1) to the effector, and then updates its memory by replacing B by $B \cup \{x(t),s(t+1), a(t+1)\}$. If the action is not imposed, agent M derives action a(t+1) based on the past experience using a simplified g in equation (2) as follows. First, agent M finds the best matched state:

$$j = \arg \min_{0 \leq i \leq t} \|s(t+1) - s(i)\|. \qquad \text{(Eq. 5)}$$

Then, the output action is determined as the action associated with the best matched so): a(j+1)=a(j). The memory update is done as before. After x(t+1) is grabbed in the next machine cycle, which may include the resulting reward sensed by the biased sensor, the system memory becomes $B=\{(x(i), s(i), a(i))|i=0, 1, \ldots, t+1\}$. As can be seen, the above-described oversimplified version of development learning can do a little generalization by extending the action learned by the nearest neighbor s(j) to the current new state s(t+1), whenever no action is imposed by the human.

When no action is imposed, the learning is action-autonomous, and the system generalizes using the nearest-neighbor rule. Thus, a feedback signal in the range [−1, 1] can be used as a reward (positive or negative). When the agent has learned more and more basic behaviors through action-imposed learning, the agent can perform more and more action-autonomous learning. During the action-autonomous learning, the reward is preferably delivered as needed and as frequent as possible to facilitate what is known as behavior shaping in learning. An oversimplified reinforcement learning method incorporated into the above action-imposed learning algorithm is as follows: modify the step of finding the nearest neighbor in the aforementioned equation 5 so that only the states whose corresponding action has received non-negative rewards are searched for.

Reward in reinforcement learning could be delayed, which raises a credit assignment problem: to what event is the reward or punishment received due? Existing reinforcement learning methods have used a single time-discounted reward value for each state-action pair. This time-discounted method has been extensively studied for problems that start with a predefined task. However, such time-based optimality criteria suffer from fundamental limitations. First, the actions adopted can differ significantly according to different time-discount models for rewards. Second, the model is task specific and, thus, the agent is not able to accept a new goal and plan on its own according to its experience. Third, it may not correctly evaluate many conflicting goals. Fourth, credit assignment should be a learned behavior that changes according to the goal and situation, instead of a static handcrafted rule.

Agents should be given reinforcement signals that are local in time whenever possible. A correct context at the time of reward is very important for association of the effect of reward with the intended action. Even if a reinforcer is delayed, stimulus should be used to bring the agent into the correct context while the reinforcer is delivered. Consider the following example: suppose that a task takes five steps. The agent made a mistake only at the third step and the overall result is a failure. Instead of letting the agent try all the possible action combinations over the five step task, the human trainer can reinforce the actions associated with the correct actions in steps 1, 2, 4, and 5 by bringing the agent into the right context and delivering the reward (i.e., saying "for step 1, you did well"). Using our simplified version of the reinforcement learning algorithm, this will require the teacher to take the agent to the correct context (s(t+1),a(t+1)), and then give the reward which is used by the algorithm to replace the reward record associated with (s (t+1), a(t+1)).

Communicative Learning

In order to gradually develop the agent's capability of communicative learning, communicative instructions are preferably conveyed during each instance of either action-imposed learning or reinforcement learning. A communicative instruction (e.g., an audio tone) becomes a conditional stimulus which elicits the conditional response (desired action). Let's consider a simple example to see how this can be done using our oversimplified developmental learning algorithm. Suppose that we want to teach the machine agent M to do two tasks: task 1: telling the name of a human individual from his or her face images, and task 2: telling the gender for the individual from his or her face images. Also, suppose that agent M has two unbiased sensors as shown in FIG. 2, one is a visual sensor (video camera) and the other is an auditory sensor (microphone). It also has a simulated biased sensor with sensory range [−1, 1] from which we can deliver reward, and an effector (speaker). For simplicity, we can model each sensor as a frame grabber which gives a vector as the current input frame. At each time instant t the video camera coupled with a frame digitizer and a preprocessor gives a brightness-and-contrast-normalized video frame v(t) which is a vector of pixels. The microphone with sound digitizer and preprocessor gives Mel-Capstrum vector hat) which characterizes the shape of the vocal tract at time t. Suppose that a different vector o(t) sent to the speaker will give a different phone. The reward vector at time t is sensed as r(t). Thus, for our simple system, the sensory input at time t is x(t)=(v(t),h(t),o(t),r(t)).

If agent M was born not long ago, it does not have a language. Thus, we cannot teach it to do the tasks without teaching it a language. The trainer thus has a simple language which uses steadily voiced phones. For simplicity, assume that each phone is represented by a single constant vector $h_i$, although in reality the h(t) vector is not perfectly constant over t during the utterance. Suppose that the trainer's family has six persons and he has designed a very simple language that has ten phones: $\{h_i | I=1, 2 \ldots, 10\}$. In his mind, the first six phones correspond to the name of the six persons and are denoted by $P_1$, $P_2$, $P_3$ . . . , $P_6$, respectively. The remaining four phones denote "who?", "gender?", "male" and "female," respectively. After the power of the machine agent is turned on, the trainer lets each person enter the view of the camera of the agent so that the face fills the entire camera frame well, stays for a while, and then leaves. During the presentation of each person, he asks about the name of the person by voicing the phone representing "who?" and then he immediately imposes an action on the machine agent by imposing the corresponding vector $m_i$, i=1, 2, . . . , 6, to the speaker effector. If he wants the agent to learn the gender of the person, he voices the phone representing "gender?" and then immediately imposes $m_9$ or $m_{10}$ making agent M respond with the phone representing the correct gender. Therefore, this process uses action-imposed and communicative learning.

Table 3 below shows the temporal transition of a session of such a learning mode, where B denotes background, $P_i$ denotes person i, $P_i'$ denotes partial view of a person i when entering or exiting the view, W denotes "who?", G denotes "gender?", M denotes "male," and F denotes "female." Each period T, denotes a period of about a few dozen machine cycles. The teaching section is designed with the following in mind. The end of each period $T_i$ is indicated by the drop of the corresponding sensory input to zero (i.e., the offset of the sensory input). For example, the offset means the end of a question. Note that the state vector s(t) records the past context of x(t) to a certain extent up to the current frame x(t). The action-imposed teaching sequence is such that an action is imposed after the offset of the corresponding sensory input that is designed to trigger the desired action. As soon as the offset of the corresponding sensory input appears in the state s(t+1), the action vector a(t+1) is produced. For example, consider period $T_4$. The last state at the period $T_4$ records the end of question "who" at the presence of person $P_2$ and this state s(j) is associated with the action "replying $P_2$" as taught by the imposed action. Suppose that in a future testing session, $P_2$ enters again. With his face filling the camera view, the trainer asks "who?" At the end of the question, the state vector s(t) is used to find the best matched state so). The associated action "replying $P_2$" is sent to the effector. A similar analysis is applicable to every state, including the reply "female" at the presence of $P_2$ at the offset of the question "gender?" Of course, with this simple single-level algorithm, the system is not able to smartly generalize the concept of gender beyond the basis of visual similarity.

TABLE 3

A temporal sequence of communicative learning

| Time Period | | $T_1$ | $T_2$ | $T_3$ | $T_4$ | $T_5$ | $T_6$ | $T_7$ | $T_8$ | $T_9$ | $T_{10}$ | $T_{11}$ |
|---|---|---|---|---|---|---|---|---|---|---|---|---|
| x(t) | See v(t) | B | $P'_2$ | $P_2$ | $P_2$ | $P_2$ | $P_2$ | $P_2$ | $P_2$ | $P_2$ | $P'_2$ | B |
| | Hear h(t) | 0 | 0 | 0 | W | 0 | 0 | G | 0 | 0 | 0 | 0 |
| | Imposed action a(t) | 0 | 0 | 0 | 0 | $P_2$ | 0 | 0 | F | 0 | 0 | 0 |
| | Reward r(t) | 0 | 0 | 0 | 0 | 0 | 0 | 0 | 0 | 0 | 0 | 0 |

Developmental Learning

As discussed above, the state trajectory is directly observed from sensory input and the state definition in equation (3). However, there are two limitations with the above simple-minded scheme. First, because memory is limited, it is not possible to memorize all of the states as defined in equation (3) for every time instance t. Second, recording all of the detailed states will make generalization (e.g., finding the best matched case) more difficult and slow.

Figure 8:
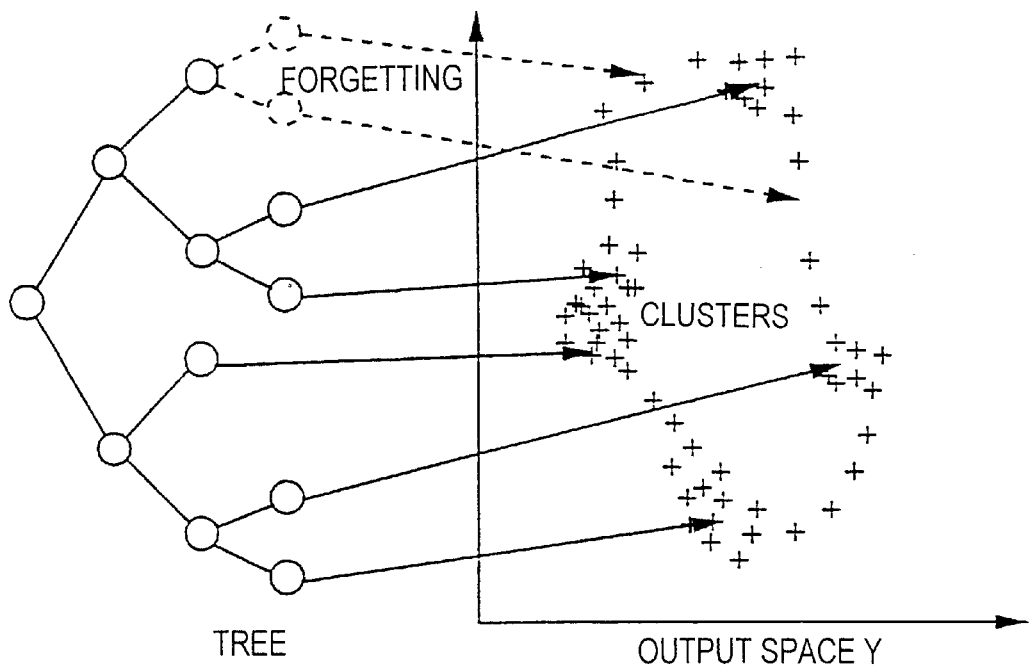
FIG. 8 is a schematic illustration of a temporal adjacency cluster.

Many state vectors that occur through time are very similar. Thus, only state centers are stored, each representing the centroid of a cluster of nearby state vectors. This is similar to the idea of vector quantization and clustering. The clustering of state centers is shown in FIG. 8. A description of how to form clusters is forthcoming herein. Since the number of centers can be very large, a regression tree is employed to quickly find the top k>1 nearest-matched centers, required in equation (5).

As shown in FIG. 8, a tree is incrementally constructed to approximate what the state transition function $f$ and the action g is at each level. The tree performs the following task: 1) automatically derives the best features in the input space; 2) automatically forgets details that are not related to the output; 3) automatically forgets information for events that have not occurred for a long time; 4) finds the best matched part cases in O(log(n)) time, where n is the number of prototypes stored in memory; and 5) generalizes outputs according to past similar cases.

Figure 9:
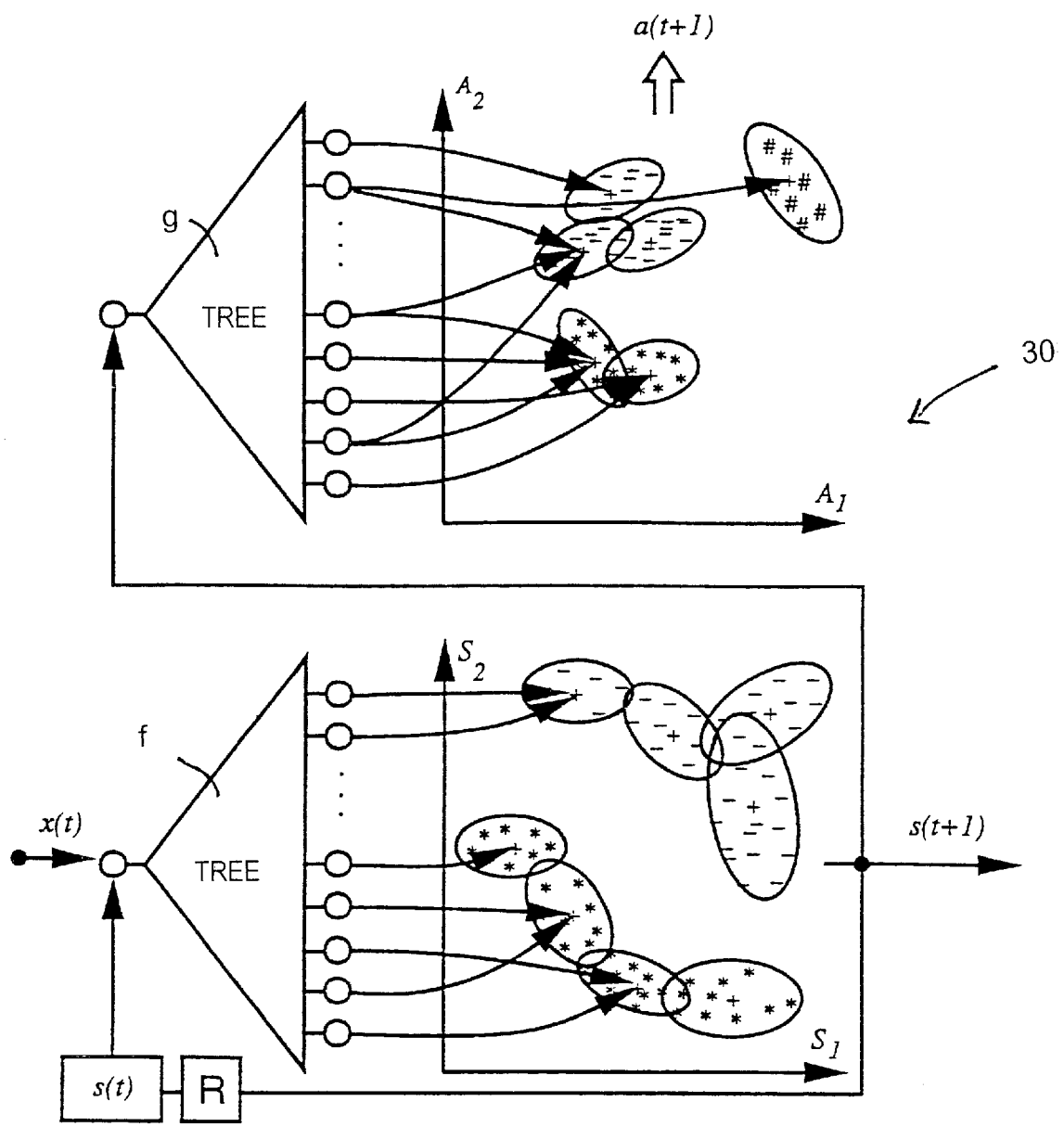
FIG. 9 is a block diagram illustrating a level building element (LBE) of the level builder.

FIG. 9 illustrates the structure of one of the level building elements such as level building element 30. Each level building element contains two components; one is to approximate the state transition function as denoted by $f$ in Eq. (1), and the other is to approximate the action g in Eq. (2). "R" denotes a delay register. The function $f$ provides the state s, while the function g may output several actions, each with a predicted confidence, as shown. The level building element accepts a sensory input vector x(t) and output a new state s(t+1), and several candidate actions a(t+1) each with some confidence. These actions are fed into the confidence accumulator 26.

The lowest level in the level builder is to implement reflexive action from direct sensory input. Thus, it does not need to consider context. In other words, the condition function $f(s(t), x(t))$ does not depend on state s(t). The level building element at the next level accepts the state input from the previous level. The state formation at higher levels has slower temporal dimension reduction so that each state represents longer temporal context. The algorithm for approximating state transition function $f$ and action generation function g using an approximation tree is described hereinafter.

The agent may have a number of sensors, such as visual sensors and auditory sensors. Not all of the sensory components in x(t) are related to the goal of the agent. Therefore, information fusion requires an attention selection capability which is a crucial mechanism for the agent to learn efficiently. Attention selection can be divided into two types, intermodal and intramodal. Intermodal attention selection allows the agent to attend only to sensors that are related to the current task. Intramodal selection allows the agent to select a part of input from a single sensing modality.

Figure 10:
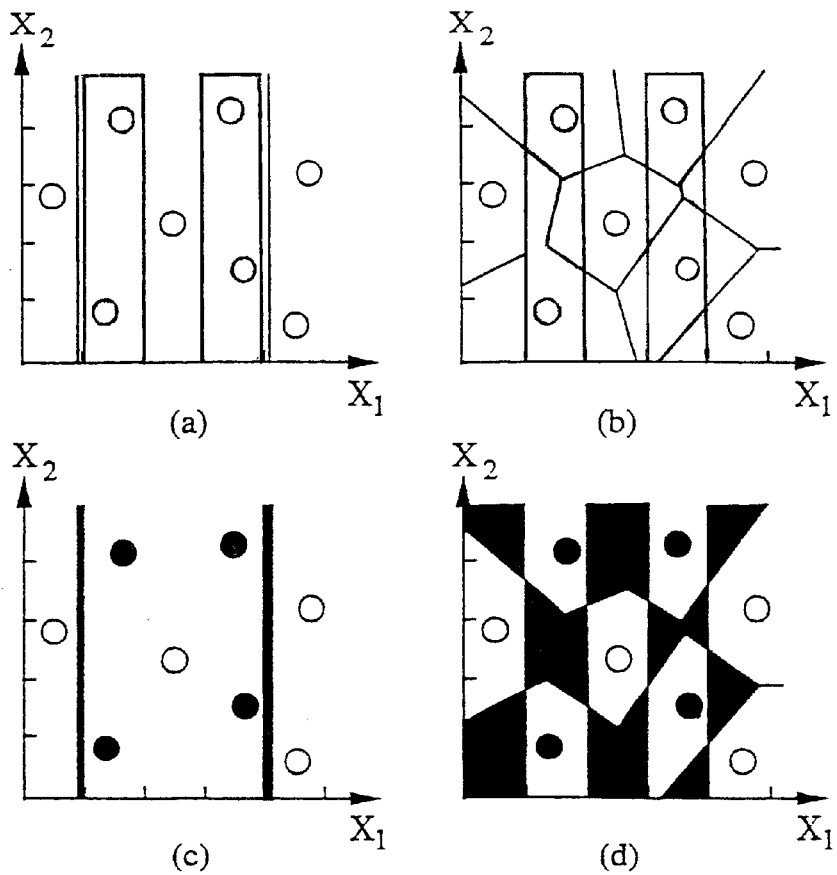
FIG. 10 illustrates the advantage of employing attention selection.

Referring to FIGS. 10a–10d, the importance of attention selection is illustrated therein. In FIG. 10a, the decision boundary is shown when the attention mechanism selects $X_1$ only. The regions of two classes are marked by white and gray intensities. The circles represent training samples whose intensity corresponds to the class. The decision boundaries are marked by straight line segments and are determined by the nearest neighbor rule in the space of $X_1$. Shown in FIG. 10b is the decision boundary of the nearest neighbor rule when the attention mechanism selects both $X_1$ and $X_2$. FIG. 10c shows misclassified areas marked by the dark shade which corresponds to FIG. 10a and FIG. 10d shows misclassified areas marked by dark shade which corresponds to FIG. 10b. FIGS. 10a–10d show why attention selection is critical for information fusion from multiple high dimensional sources. As shown, a classification problem using the nearest neighbor rule is used for explanation. The underlying class boundaries shown in FIG. 10a indicate that they are independent of $X_2$. The random training samples are relatively sparse, which is the case in highdimensional inputs. If the attention selection mechanism selects the right input components ($X_1$ in FIG. 10a), the misclassification rate is small, as shown in FIG. 10c. If both sensory inputs $X_1$ and $X_2$ are used (FIG. 10b), the misclassification rate is large, as indicated in FIG. 10d. Therefore, a method that does not discard unrelated components may result in a much larger error rate than the ones that do.

Figure 11:
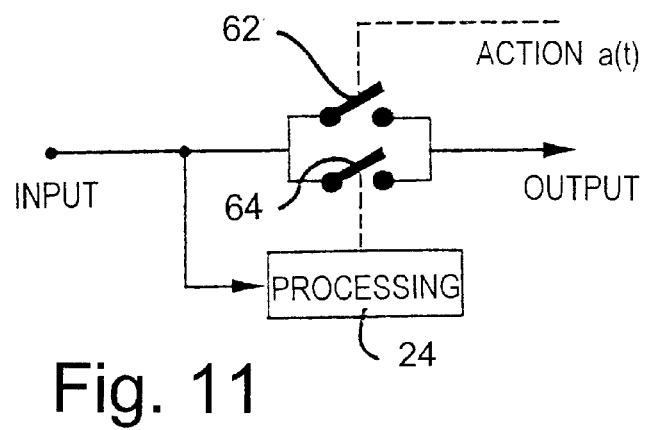
FIG. 11 is a block diagram illustrating the attention selection mechanism.
Figure 12:
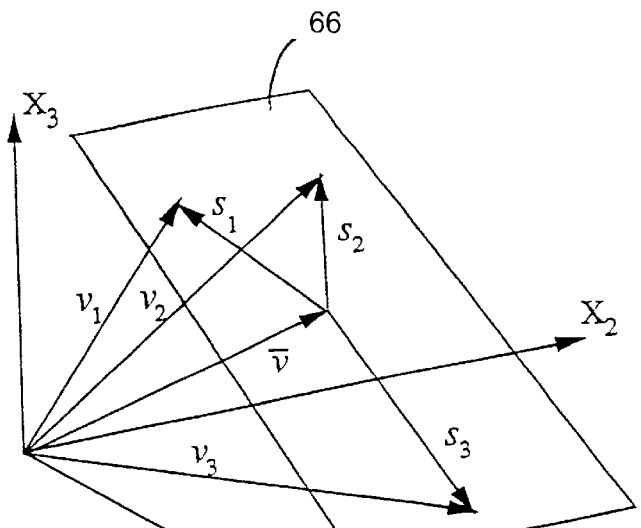
FIG. 12 illustrates a linear variety hyper plane.

Attention selection may be modeled by two modules; the leaned module and the programmed (innate) module. For example, when a person reads a book, he will not pay much attention to hearing, because the context is "reading." This is the learned module. However, a person will switch his attention away from reading if a loud thunder is sensed, which is the programmed module. Therefore, in our implemented attention model, the learned module and programmed module for each sensing channel have a logical OR relationship: the channel is on either the learned module or programmed module. As shown in FIG. 11 the two modules of the attention selection mechanism are shown in which the learned module controls an upper switch 62 and the program module controls a lower switch 64, to select the desired module.

The programmed module of attention selection depends on two factors, the intramodal novelty and intermodal capacity limit. Attention is given to channels that have a large relative novelty, and attention is shut off on channels that have a low relative novelty. To avoid frequent switching of channels on-and-off when the novelty is at a border level, the attention selection uses hysteresis: two thresholds are used, $T_l < T_h$. If the attention is currently off, it is turned on only when the relative novelty is higher than $T_h$. If attention is currently on, it is turned off only when the relative novelty is lower than $T_l$. The novelty can be measured as an Euclidean distance between consecutive time steps of input from a sensor. The intermodal capacity limit is useful to avoid information overload. The number of channels that are turned on by the programmed module of attention selection generally cannot be larger than the capability limit.

The learned module of attention selection is a part of the action a(t) of the system. Unlike other actions, attention selection actions typically cannot be imposed by the teacher. However, the teacher may present sensory input as needed to attract attention toward certain sensors or certain parts of a sensor using properties of the programmed module of attention selection. Attention patterns that occur either due to the programmed module or the learned module are learned and remembered by the system as inter-effector actions. Therefore, the human teacher can present sensory stimuli during various training sessions to establish the desired attention selection behaviors in the right context.

For complex sensors, such as visual sensors, there is also an intramodal attention selector. An intramodal attention selector for vision selects a subregion of the image for processing. For example, the region of attention in the experiments given below is a circular shape parameterized by the position and radius of a circle. The image part that is covered by this circle is normalized to a standard size before being fed to the spatiotemporal associator 20. This intramodal attention mechanism will allow the agent to automatically associate partial sensory input of an object to the identity of the object or the desired action. This will allow the system to recognize an occluded object from a partial view. For example, if the agent attends to only an eye region of a human face when it learns to recognize human faces, it will be able to recognize the person from the eye region only if the eye region is unique among the faces that the system has learned.

Amnesic Average

In incremental learning, the initial centers of clusters are largely determined by early input data. When more data are available, these centers move to more appropriate locations. If these new locations of the cluster centers are used to judge the boundary of each cluster, the initial input data may have been incorrectly classified. In other words, the center of each cluster contains some earlier data that may not belong to this cluster. To reduce the effect of these earlier data, the amnesic average can be used to compute the center of each cluster. The amnesic average can also track dynamic changes of the environment better than a conventional average.

The average of n input data $x_1, x_2, \ldots, Xx_n$ is given by:

$$\bar{x}^{(n)} = \frac{1}{n}\sum_{i=1}^{n} x_i = \sum_{i=1}^{n} \frac{1}{n} x_i. \qquad \text{(Eq. 6)}$$

In the above, every $x_i$ is multiplied by a weight 1/n and the product is summed together. Therefore, each $x_i$ receives the same weight 1/n. This is called an equally weighted average. If $x_i$ arrives incrementally and we need to compute the average for all the inputs received so far, it is more efficient to recursively compute the current average based on the previous average:

$$\bar{x}^{(n+1)} = \frac{n\bar{x}^{(n)} + x_{n+1}}{n+1} = \frac{n}{n+1}\bar{x}^{(n)} + \frac{1}{n+1} x_{n+1}. \qquad \text{(Eq. 7)}$$

In other words, the previous average $\bar{x}^{(n)}$ gets a weight n/(n+1) and the new input $x_{n+1}$ have a weight 1/(n+1). These two weights sum together to equal one. The above recursive equation 7 gives an equally weighted average.

An amnesic average is such that if i<j, then $x_i$ receives a smaller weight than $x_j$. In the recursive form, an amnesic average can take the form:

$$\bar{x}^{(n+1)} = \frac{n-l}{n+1}\bar{x}^{(n)} + \frac{1+l}{n+1} x_{n+1} \qquad \text{(Eq. 8)}$$

for n>1. When n is small, an equally weighted average can be used. The parameter l>0 is called an amnesic parameter. When l=0, equation 8 gives an equally weighted average. When l>0, an old input receives a smaller weight than a newer input. For example, l can be a constant l=1, and l can also be a function of n. In any case, the weight for each $x_i$ should be non-negative and all the weights should sum together to equal one.

The amnesic average can also be applied to the recursive computation of a covariance matrix $\Gamma_x$ from incrementally arriving samples: $\{x_1, x_2, \ldots, x_n \ldots\}$, where $x_i$ is a column vector. Using the amnesic average $\bar{x}^{(n+1)}$, up to the (n+1)th sample, we can compute the amnesic covariance matrix up to (n+1)th sample as:

$$\Gamma_x^{n+1} = \frac{n-l}{n+1}\Gamma_x^{(n)} + \frac{1+l}{n+1}(x_{n+1} - \bar{x}^{(n+1)})(x_{n+1} - \bar{x}^{(n+1)})^T \qquad \text{(Eq. 9)}$$

Linear Manifold

Given a set of vectors $V=\{v_1, v_2, \ldots, v_n\}$, which is a subset of vector space X, a linear combination of these vectors can be provided in the form $a_1v_1+a_2v_2$, where $a_i$, i=1, 2, ..., n,, are any real numbers. The subspace spanned by $S_l$, denoted by span (S), consists of all the possible linear combinations from the vectors in S. Thus, with q center vectors in C, the translation of a subspace is called a linear manifold (also called a linear variety). The subspace M translated to vector $v_0$ is denoted by $v_0+M$: $\{v_0+m|m\in M\}$.

For numerical stability, we can use the center of the vectors in V as follows:

$$\bar{v} = \frac{1}{n}\sum_{i=1}^{n} v_i$$

and define the set of scatter vectors from their center: s=$\{v_i-\bar{v}|i=1,2,\ldots,n\}$. The n vectors so constructed are not linearly independent since the sum of all the n scatter vectors are equal to a zero vector. Let S be the set that contains these scatter vectors: S=$\{s_i|i=1, 2, \ldots, n\}$. A linear combination of the vectors in s are of the form $\alpha_1 s_1+\alpha_2 s_2+\ldots, +\alpha_n s_n$, where $\alpha_i$,i=1, 2, ... n, are any real numbers. The subspace spanned by s, denotes by span(S), consists of all the possible linear combinations from the vectors in s.

Figure 13:
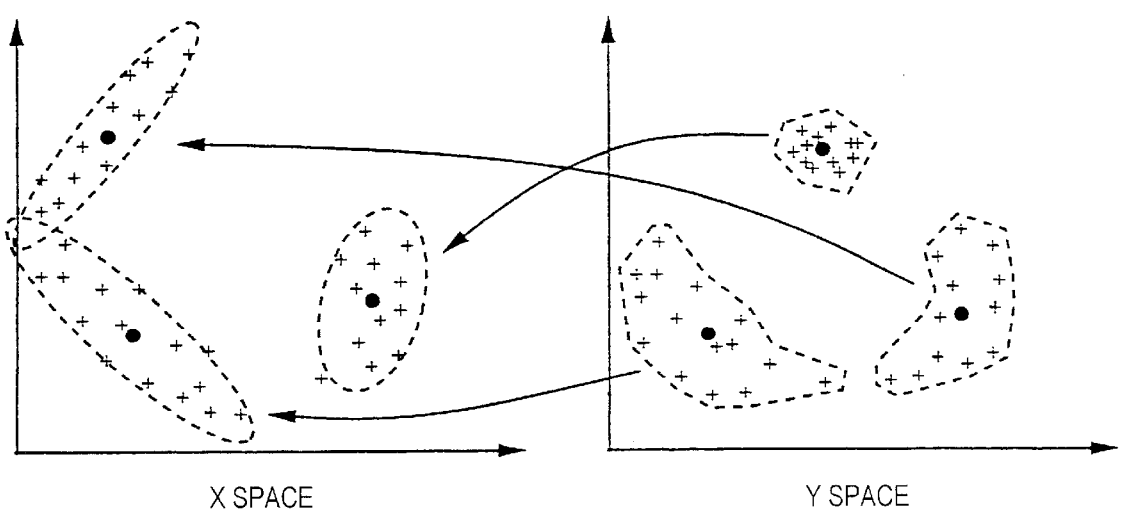
FIG. 13 illustrates y-clusters and x-clusters updated at each node.

A translation of a subspace is called a linear manifold. The subspace M translated to vector $v_0$ is denoted by $v_0+M$:$v_0+M=\{v_0+m|m\in M\}$. Thus, the subspace that passes the head tips of the vectors in S can be represented by the linear manifold D=$\bar{c}$+span(S), as shown in FIG. 13.

For efficient computation of Mahalanobis distance in the manifold, we need its orthonormal basis. The orthonormal basis $a_1, a_2, \ldots a_{n-1}$ of the subspace span(S) can be constructed from the radial vectors $s_1, s_2, \ldots, s_n$ using the Gram-Schmidt Orthogonalization (GSO) procedure as follows:

Given vectors $S_1, S_2, \ldots, S_{n-1}$, compute the orthonormal basis vectors $S_1, S_2, \ldots S_{n-1}$.

1. $a_1 = s_1 / \|s_1\|$.
2. For $i=2, 3, \ldots, n-1$, do the following $$(a) a'_i = s_i - \sum_{j=1}^{i-1} s_i^T a_j.$$

$$(b) a_i = a'_i / \|a'_i\|.$$

In the above procedure, a degeneracy occurs if the denominator is zero. In the first step, the generacy means $s_i$ is a zero vector. In the remaining steps, the corresponding vector $s_i$ should be discarded in basis computation. The number of basis vectors that can be computed by the GSO procedure is the umber of linearly independent radial vectors in S.

Given a vector $x \in \chi$, the scatter part $S = x - \bar{v}$ can be computed. Then the projection of x onto the linear manifold is computed. Its i-th coordinates in the orthonormal basis is given by $\beta_i = s^T a_i$, $i=1, 2, \ldots, n-1$. The vector $f=(\beta_1, \beta_2, \ldots \beta_{n-1})^T$ is referred to as the feature vector in linear manifold S.

Hierarchical Discriminate Analysis

Suppose that we want to approximate a function h: $X \rightarrow Y$. The samples $(x_1, y_1)$ arrives incrementally, where $y_1 = h(x_1)$, $i=1, 2, \ldots$ In some of these samples, the desired output $y_1$ may not be given, denoted by $(x, *)$. If y is not given, the algorithm must provide an estimate of the is not given, the algorithm must provide an estimate of the y corresponding to x using the currently constructed function approximator. If $y_1$ is a class label, we can use linear discriminant analysis since the within-class scatter and between-class scatter matrices are defined. However, no class information is available for a developmental algorithm, since it must be task independent. In other words, y $\in Y$ is a continuous output, which can take any value for each component. This is a fundamental challenge.

A new hierarchical statistical modeling method is presented here. Consider a mapping h: $X \rightarrow Y$, which is to be approximated by a regression tree for the high dimensional space X. The goal is to automatically generate discriminate features, although no class label is available (other than the numerical vectors in Y space). The training samples arrive incrementally in the form of (x, y), where y=h(x), and a recursive partition tree is constructed incrementally. We want to process each sample (x,y) to update the tree using only a minimal amount of computation.

Two types of clusters are incrementally updated at each node of the tree - y-clusters and x-clusters. The y-clusters are clusters for the Y space and x-clusters are those for the X space. There are q (e.g., q=6) of each type in general at each node. The q y-clusters determine the virtual class label of each arriving sample (x, y), based on its y part. The virtual class label is used to determine which x-cluster (x, y) should be updated using its x part. Each x-cluster represents the sample population of a child node which is the root of the subtree that refines the population. At each node, y in (x, y) finds the nearest y-cluster and updates (pulling) the mean of the y-cluster. This y-cluster indicates that which the corresponding x-cluster (x, y) belongs to. Then, the x part of (x, y) is used to update the x-cluster (mean and covariance). The mean and variance of every x-cluster are used to estimate the probability for the current sample (x,y) to belong to the x-cluster, whose probability distribution is modeled as a multidimensional Gossip at this level around the neighborhood covered by the node. In fact, the q centers of the q x-clusters give q-1 discriminate features which span (q-1 discriminate space. An incremental computation method for PCA is used by each x-cluster to update its axis of covariance matrix in the (q-1)-dimensional discriminate space. The Mahalanobis distance from x to each of the q x-clusters clusters is used to determine which children should be further searched. If the probability is high enough, the sample (x, y) should further search the corresponding child (may be more than one but with an upper bound) recursively.

For computational efficiency, none of the x-clusters and y-clusters keep samples, unlike traditional batch clustering methods. Only the first-order statistics (and the second order statistics for x-clusters) are used to represent the clusters. A new update equation is used so that the contribution from samples older than a half of the current age is forgotten significantly. This way, very old initial samples do not have permanent effect in development, so that the centers of clusters can well adapt to newer experiences.

In summary, tie algorithm incrementally builds a recursive partition tree from a sequence of incrementally arriving samples (x, y). The deeper a node is in the tree, the smaller the variances of its x-clusters are. The following is the outline of the incremental algorithm for tree building and also for tree retrieval when y is not given.

Procedure to Update Node

Given a node N and (x, y), where y may or may not be given, update the node Nusing (x, y) recursively. Output is the top matched terminal nodes. Parameters include k which specifies the upper bound in the width of parallel tree search; $p_0$ which specifies the probability threshold to further explore a branch; and c which represents if it is on the central search path. If c=1, the node is pointed to by a central cluster, and if c=0 it is not.

The procedures for updating the node includes (1) finding the top matched x-cluster in the following way. If c=0 skit to step (2). If y is given, do (a). Otherwise do (b).

(a) Update the y-cluster nearest y in Euclidean distance. The central x-cluster is the one that corresponds to the y-cluster.

(b) Find the x-cluster nearest x according to probability. The central x-cluster is this x-cluster.

(c) Update the central x-cluster. The top matched x-cluster corresponds to the child node that is on the central search path along which x is used to update x-clusters. Mark this central x-cluster as active.

(2.) For all the x-clusters of the node N, compute the probability for x to belong to the x-clusters. (3.) Rank the probabilities in decreasing order. (4.) In addition to the central x-cluster, choose more x-clusters according to decreasing probability until the probability is smaller than $p_0$ or a total of k x-clusters have chosen. (5.) Return the chosen x-clusters as active clusters.

Procedure for UpdateTree

Given the root of the tree and sample (x, y), update the tree using (x, y). If y is not given, estimate y and the corresponding confidence. Parameters include k which specifies the upper bound in the width of parallel tree search, $p_0$ which specifies the probability threshold to fer explore a branch.

The procedures for updating the tree includes (1.) From the root of the tree, update the node by calling UpdateNode using (x, y) with c=1. (2.) For every active cluster received, check if it points to a child node. If it does, mark it inactive and explore the child node by calling UpdateNode. At most $q^2$ active x-clusters can be returned this way if each node has at most q children. (3.) The new central x-cluster is marked as active. (4.) Mark additional active x-clusters according to the largest possible probability, up to k total if there are that many x-clusters with $p \geq p_0$. (5.) Do the above steps (2) through (4) recursively until all the resulting active x-clusters are all terminal. (6.) For each terminal x-cluster $x_i$ with probability $p_i$, its output vector is the center $y_i$ of the corresponding y-clusters. They are considered as discrete distribution at $y_i$ with probability $p_i$, i=1, 2, ..., q.

If the current situation is interesting, the top-matched x-cluster is split into two new x-clusters, one being modified from the old x-cluster and the other being from the current input. A situation is interesting if one of the following conditions is met. (1) During the action imposed learning, the derived action a is significantly different from the imposed action, compared with the diagonal covariance matrix of the y-cluster corresponding to the top-matched x-cluster. (2) The reinforcement signal is extreme (e.g., −1 or 1). If the current node has less than q x-clusters, both x-cluster are in the same node. Otherwise, a new child is spawn from the top-matched x-cluster. This newly generated child is now given the two new x-clusters. These two x-clusters are formed in the following way. One is the center of the top-matched x-cluster. The new x-cluster contains the new x part of the current input (x, y). Both new x-clusters have a default covariance matrix as the starting covariance matrix. They also have y-clusters. The first x-cluster uses the original y-cluster. The second x-cluster creates a new y-cluster in the following way: If y is given, its y-cluster takes y as the center. Otherwise, it uses the currently derived y as the center autonomous learning.

This is a hierarchical version of the well-known mixture-of-Gossip distribution models: the deeper the tree is, the finer the virtual class partition is. Thus, the statistical model is hierarchical. At shallow levels, the sample distribution is approximated by a mixture of large Gaussians (with large variances). At deep levels, the sample distribution is approximated by a mixture of many small Gaussians (with small variances). The multiple search paths guided by probability allows a sample x that falls in between two or more Gaussians at the lowest level to generate high confident output y if these Gaussians have similar y vectors. Due to the use of virtual labels derived at each level according to incremental Y space clustering, the orientation of the Gaussians in X space will be turned to y values—with long axis of Gaussians along the direction in which the y vector changes slow.

The proposed method is also an extension of the well-established Markov decision process model in the following aspects: (1) each state has a vector representation instead of just an atomic symbol; (2) the representation of each state has a part of history; (3) multi-level states are included instead of single-level states; (4) automatically forming states and forgetting states; (5) what states are formed depend on the system's action (e.g., attention); and (6) which states are formed depend on rewards. It is expected that this rigorous statistical model will significantly speed up the learning and give much better performance with the same amount of learning time.

Both functions $f$ and $g$ in each level building element use this hierarchical discriminate analysis. For the case of action generation function g, the output is given in action imposed learning. In reinforcement learning, the actual action actually tried is used as the y vector. For state transition function $f$, it seems that no y vector is available. This is however not the case. When a new input vector (s(t), x(t)) arrives, the vector (R(s(t)), x(t)) should be used as the desired should be used as the desired y vector due to the need of short term memory. Therefore, typically the corresponding terminal x-cluster will spawn a child or generate more x-clusters. The forgetting process will delete terminal nodes that are not visited often, making their parent become a terminal node.

There is also a need to estimate the distance or probability for an input vector x to belong to a cluster. For a real-time system, it is typically the case that the system cannot afford to keep all the samples in each cluster. Thus, each cluster will be represented by some statistical measures with an assumed distribution.

First, considering x-clusters, each x-cluster is represented by its amnesic average as its center and its amnesic covariance matrix. However, since the dimensionality of the space X is typically very high, it is not practical to directly keep the amnesic covariance matrix. If the dimensionality of X is 3000, for example, each covariance matrix requires 3000×3000=9,000,000 numbers. Yet, more efficient method is adapted.

Each internal node keeps q x-clusters. Before q different x-vectors are received, each new x-vector is used to record a new x-cluster, with an initial covariance matrix $\sigma^2 I$. q x-clusters are formed as soon as it has received q different y-vectors. The centers of these q x-clusters are denoted by c, as follows:

$$C=\{c_1, c_2, \ldots, c_q | c_i \epsilon X_i = 1, 2, \ldots, q\}. \quad \text{(Eq. 10)}$$

The locations of these q centers includes the subspace D is which these q centers lie. D is a discriminate space since the clusters are formed based on the Y space. It is the space characterizing between class scatter. In Fisher's linear discriminent analysis, we find a subspace that maximizes the ratio of between class scatter and within class scatter. Since the entire discriminate space D is used, there is no need to consider the within class scatter here in finding D, and thus simplifies the computation. Once this discriminate space D is found, we use Mahalanobis distance in d to take care of the reliability of each dimension in D.

It is worth noting the relation between LDA analysis and Mahalanobis distance. Fisher's LDA in D gives a basis for a subspace $D' \subseteq D$. This basis is a properly oriented and scaled version of D so that the within class scatter in D' is a unit matrix. In other words, all the dimensional axes in D' are already weighted according to the within class scatter matrix W of D. If the within class scatter matrices of all the classes are the same, the Euclidean distance in D' is the same as the Mahalanobis distance in the discriminate space D'. However, in general, all the within class scatter matrices are not the same as the Mahalanobis distance in D', and thus the latter should be a more appropriate distance matrix than the former in characterizing the distribution shape of each cluster.

In Procedure for updating the tree, we assume that there are already q y-clusters. In reality, the first q different y vectors are recorded as the center of the q y-clusters as explained by the following outline of the cluster update procedures.

Update Y-Clusters Procedure

Given y and the current centers of y-clusters $y_1, y_2, \ldots, y_j$, j<q, update the y-clusters as follows.

1. If j<q−1 do (a). Otherwise, do (b).
   (a) If $y \neq y_2$, for all i=1, 2, ..., j, $y_{j+1}=y$ and j is incremented by one.
   (b) Find j in the following equation:

$$j = \arg\min_{1 \leq i \leq q}\{\|y_i - y\|\}$$

2. Use amnesic average to update the cluster center $y_j$ and the covariance matrix using y.

Each y-cluster can be represented by the amnesic average as the center of the cluster. For the y-clusters, the distance between a y-vector y and a y-cluster can be measured as the Euclidean distance between y and the amnesic mean of the y-cluster, provided that the Euclidean distance in Y space is appropriate. If an effector is such that the output effect is more sensitive to a certain component in the y control vector and less sensitive to others, the effector control vector should be redefined by properly weighting each component according the sensitivity. In this newly defined control vector, the Euclidean distance is then appropriate.

Now we turn to the issue of how to represent the space D which is spanned by the centers in equation 10. These centers are vectors in X, which typically has a very high dimensionality. However, the Mahalanobis distance from a vector $x \in X$ to each x-cluster represented by its center $c_i$ and the covariance matrix $\Gamma_i$ is defined by:

$$d(x, c_i) = (x - c_i)^T \Gamma_i^{-1} (x - c_i) \quad \text{(Eq. 11)}$$

which requires the inverse of the covariance matrix. Two problems exist. First, the covariance matrix is very large if represented in X space directly. Second, the sample covariance matrix (such as that estimated by the amnesic average), which we will be using to estimate a covariance matrix, is not invertible before the number of samples reach a very high number of dimensionality of X. On the other hand, we must find an efficient way of computing the Mahalanobis distance from each x-cluster. A way to address the first problem is to represent the discriminant space by an orthonormal basis vector. We keep an orthonormal basis of the linear manifold D. To address the second problem, we represent the covariance matrix in the subspace D using the orthonormal basis. Since the dimensionality of D is just q−1, the covariance matrix is much smaller than that is the original space X.

The computational steps are described as follows. Suppose that the dimensionality of space X is d. From q x-cluster centers in equation 10 in X, use the GSO procedure to compute the q−1 orthonormal basis vector $M = (\epsilon_1, \epsilon_2, \ldots \epsilon_{q-1})$, where each column $\epsilon$ is a unit basis vector, $I = 1, 2, \ldots q-1$, and M is an $d \times (q-1)$ matrix. For each x-cluster center $c_i$, its coordinate vector in the orthonormal basis M is given by $$e_i = M^T c_i.$$

Thus, each x-cluster $c_i$ is represented by only a (q−1)-dimensional vector $e_i$. Given an unknown vector $x \in X$, project it onto the basis $e = M^T x$. Then, the Mahalanobis distance in equation 11 is computed only in (q−1)-dimensional space using the basis $\epsilon$, instead of the original X space. The covariance matrix $\Gamma_i$ for each x-cluster in only an (q−1)×(q−1) square symmetric matrix, of which only q(q−1)/2 numbers need to be stored. When q=6, this requires 15 numbers.

To compute the Mahalanobis distance in equation 11, we can use numerically efficient methods. For example, we can use Cholesky factorization. Cholesky factorization is used for a possible definite matrix, which is symmetric. The Cholesky decomposition algorithm find a lower triangular matrix L from $\Gamma$ so that $\Gamma$ is represented by $\Gamma = LL^T$.

Cholesky factorization procedures: given an n×n positive definite matrix $A = [a_{ij}]$, compute lower triangular matrix $L = [l_{ij}]$, so that $A = LL^T$.

1. For i=1, 2, ..., n, do (a) For j=1, 2, ..., i−1, do $$(a) \quad l_{ij} = \left(a_{ij} - \sum_{k=1}^{j-1} l_{ik} l_{jk}\right) / l_{jj}$$

$$(b) \quad l_{ii} = \sqrt{a_{ii} - \sum_{k=1}^{i-1} l_{ik}^2}$$

With low triangular matrix L, we first compute thle difference vector from the input vector x and each x-cluster center $c_i$: $d_i = x - c_i$. The Mahalanobis distance is given by:

$$d(x, c_i) = v^T \Gamma_{i-1} v = v^T (LL^T)^{-1} v = (L^{-1} v)^T (L^{-1} v). \quad \text{(Eq. 12)}$$

We solve the linear equation Ly=v and then $y = L^{-1} v$ and $d(x, c_i) = (L^{-1} v)^T (L^{-1} v) = \|y\|^2$. Since L is a lower triangular matrix, the solution of y in Ly=v is trivial since we simply use backsubstitution.

The Mahalonobis distance is very useful for deriving an estimate of the probability. According to hierarchical probability modeling, q-dimensional joint Gossip distribution is used to model the distribution of each x-cluster. The Mahalanobis distance in equation 12 can be approximated by an $X^2$ distribution with degrees of freedom q−1. If the Mahalanobis distance is computed at $d_0$, then the probability for x that belongs to the corresponding x-cluster to have a Mahalanobis distance $d_0$ and larger is defined as:

$$\text{Prob}(d \geq d_0) = \int_{d_0}^{\infty} p(x) dx = 1 - F(d_0)$$

where p(x) is the probability density function of $x^2$ distribution and F(x) is the probability distribution function. If $1 - F(d_0)$ is smaller than a predefined probability value (e.g., 0.2), then the corresponding child is not further searched.

The Update tree procedure needs to produce outputs as a function approximator with a confidence measure. For both state output (for $f$) and action output (for g), multiple outputs can be produced and ranked by confidence measured. For our implemented version, we adopt to output a single state for $f$, for computational efficiency. Action generation function may generate multiple action. All the output action will be fed into confidence accumulator for deciding which action is the most confident the current time.

There are two ways to output an uncertain output, (A) distribution and (B) expected action with expected variance. Output type (A) contains all the possible actions, each with an estimated probability. This represents a discrete distribution. Output type (B) contains only one action with uncertainty represented by the expected variance. If Gaussian distribution is used, the distribution can also be derived. Output type (A) contains more information than type (B), but type (B) is more computationally efficient.

The state clustering in the hierarchical discriminant analysis can forget details that are not important to the actions. However, even with this statistical analysis, the level builder will only increase in memory over time. This is not practical, since the memory of the machine is finite. Thus, we need a forgetting mechanism.

Figure 14:
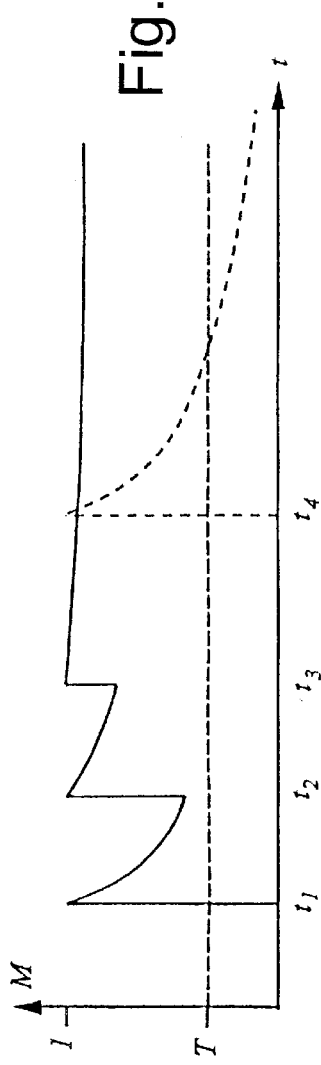
FIG. 14 is a memory curve graph illustrating the update of memory trace M as a function of time t.

The forgetting process takes care of state vectors that do not occur very often. Each node of the SHOSLIF tree has a memory residual register whose updating curve is shown in FIG. 14, and which may also resemble what we know about human memory characteristics. FIG. 14 shows an update of memory trace M through time t. The solid curve represents a node which is visited often enough to be kept. The dashed curve indicates an element that is not visited often enough and thus, it falls below the threshold T before being visited again.

Whenever a tree node is visited, its trace is reset to 1 and then the trace curve declines using a slower speed. We define a series of memory fade factors $\alpha_1 < \alpha_2 < \ldots < \alpha_m \approx 1$. $\alpha_i$ is used for a node that has been visited i times. The memory trace r can be updated by $r \leftarrow r\alpha_i^t$, where t is the number of system cycles (refreshes) elapsed since the last visit to the node. When a node is visited, its memory trace is updated first from what remains from the last visit. If the memory trace falls below the designated threshold, the node should be deleted and so it is marked as to-be-deleted. If what is deleted is more than a single element (i.e., a subtree), the deleting process will not delete it right away to avoid consuming too much CPU time in a real time process. Instead, it preferably places the subtree in a garbage buffer which is to be cleaned when the learner is sleeping.

The confidence accumulator uses a probability model to determine which action is the most confident. It applies conditional probability to each level, with more probability assigned to higher levels. These level-based probability assignments are adjusted according to the experience. The simplest version is to assign a fixed confidence from every level no matter if it is high or low. In other words, suppose that the provided actions are put together $\{\{y_i, p_i | i=1, 2, \ldots, n\}$, regardless of the level of each source. The probability is probably scaled by a single number so that the sum is equal to one. The output action y is given by the expected $$\bar{y} = \sum_{i=1}^{n} y_i (p/m).$$

This simple scheme can work reasonably well. This is called probability normalization and expectation.

The degree of ambiguity of actions depends on the dependency of the action on the context. We first discuss a case where an action requires a long temporal context (e.g., an action followed by a sentence that demands it). At a lower level, the state vector does not contain much information and thus each lower-level state may lead to many different actions. With our method, each action does not have much confidence. At a higher level, the situation is very different. Since the state at the higher level covers more temporal context, the number of possible actions is small and the probability distribution concentrates on fewer actions. In this situation, the action accumulator will pick the most confident action that is supported by high level with high confidence and supported by low levels with a relatively low confidence.

Next, consider a case where an action requires only very short temporal context, a call of your name while you are watching a movie. At a higher level, the long temporal context covers that is going on in the movie, which is new to you. The last call only covers a small part of the state vector. Thus, it is a very new state that does not have a good match in your experience. This is the produced action at the high level, no matter that it is by chance, has a very low probability. However, at a lower level, a call of your name will cause you to turn your head toward the origin of the sound source. This action has been executed many times and is almost unique as far as this low level is concerned. Thus, the expected y value from the confidence accumulator is mainly contributed from lower levels.

In summary, if a confident action is available from a higher level, such an action may be among many low confidence actions or few high confidence actions at lower levels. In either case, the action from higher level is passed. If no confident action is available from a higher level, the role of higher level is small in producing the actual action. The distribution of actions from lower levels play a more important role.

Developmental Learning Machine Hardware

Figure 15:
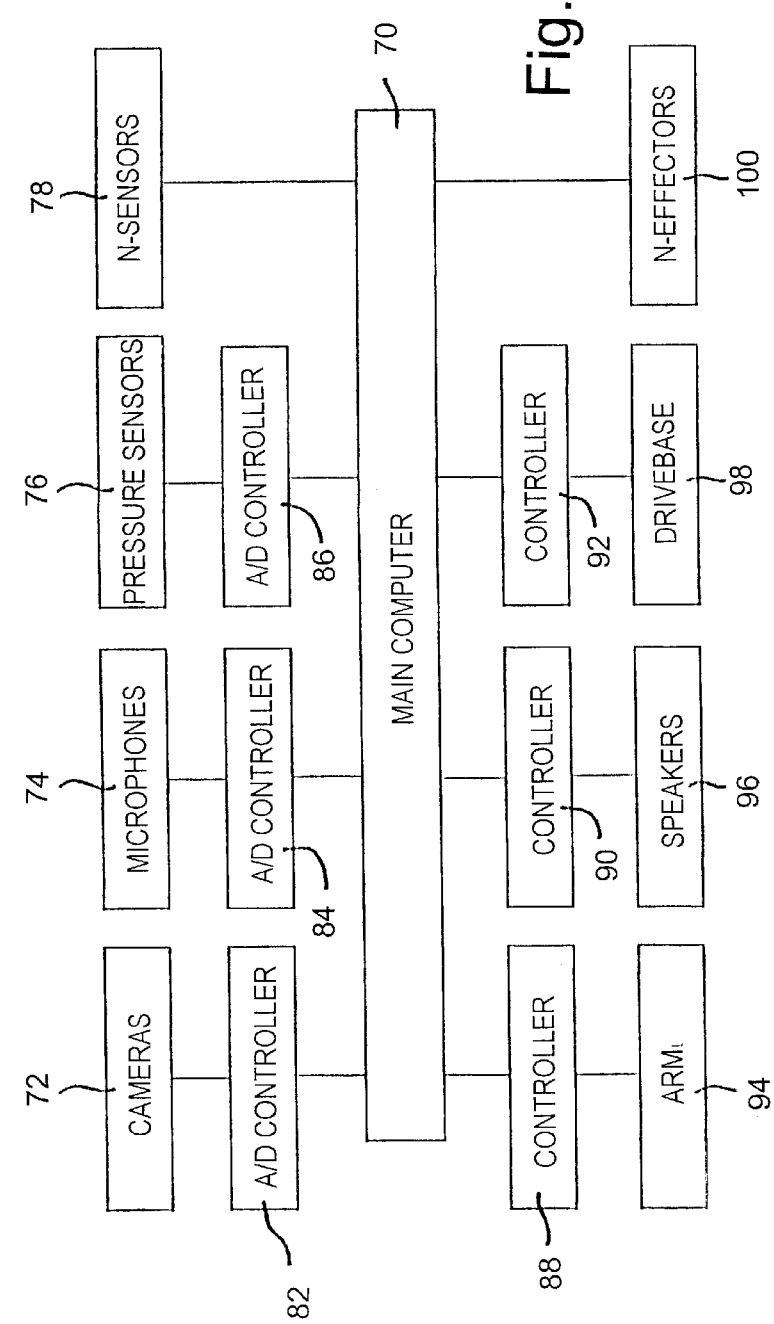
FIG. 15 is a block diagram illustrating the hardware employed in the developmental learner implemented in a mobile robot.
Figure 16:
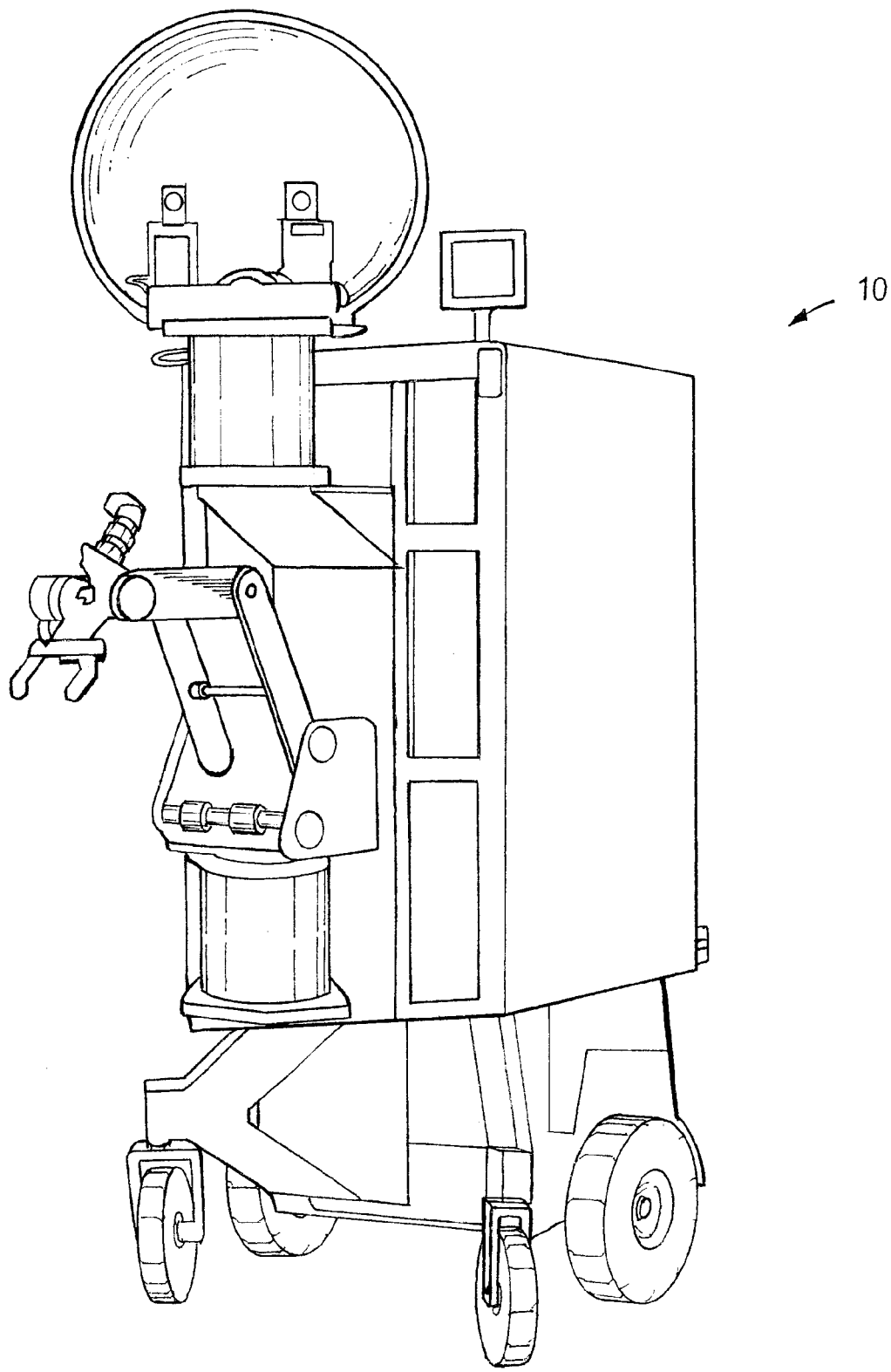
FIG. 16 is a pictorial illustration of the self-organizing incremental developmental learner implemented in a mobile robot.

Referring to FIGS. 15 and 16, an example of a developmental learning machine 10, referred herein as a self-organizing autonomous incremental learning (SAIL) machine, is shown in the form a mobile robot. One example of a robotic machine is described in Michigan State University Technical Report MSU-CPS-96-60, entitled "The Learning Machine Initiative," dated December 1996. The developmental learning machine 10 employs a main computer 70 with one or more on-board microprocessor(s). According to one example, the main computer 70 has a Micron Powerdigm XSU computer, including dual 333 Mhz, Pentium II processors, 512 megabyte RAM, 27 gigabyte RAID disk array including three 9-GB 10,000 RPM Ultra SCSI Wide drives with Adaptec AAA-133 array adapter nmning at RAID-0 mode, and an NT operating system. The main computer 70 processes received sensed data according to the developmental learning algorithm and provides control actuation signals to the effectors.

The developmental learning machine 10 has a number of sensors including cameras 72, microphones 74, pressure sensors 76, and may include other N-sensors 78. Each of sensors 72–76 are input into the main computer 70 via analog to digital (A/D) controllers 82–86, respectively. The sensors employed by machine 10 can be divided into three classes which include extroceptive sensors, proprioceptive sensors, and introceptive sensors. The extroceptive sensors include visual sensors such as two microvideo cameras 72, the auditory sensors include four microphones 74, haptic sensors, such as 13 pressure sensors on the arm, a pan-tilt base for eyes, a rotary base for neck and body, four on the bumper, and numerical effectors simulated by the main computer. The proprioceptive sensors include motor encoder sensors, inter-finger distance sensors, motor overload sensors, and limb limit switches. The introceptive sensors include computer clock and battery voltage sensors.

Also included in the developmental learning machine 10 are a number of effectors including robot arms 94, speakers 96, drive base 98, and other various N-effectors 100. Each of the effectors 94–98 are controlled by local controllers 88–92, respectively, which in turn are connected to the main computer 70. The effectors act on the environment according to given control sigual vectors, and may also act on part of the robot itself, such as for loading cargo on the robot's carrier, etc. The effectors can be divided into two classes including the extro-effectors and intero-effectors. The extro-effectors include the robot arm 94 for object manipulation, the robot drive base 98 for locomotion, the speaker 96 for speaking, and numerical effectors simulated by the main computer. The intero-effectors may include pan-tilt bases for visual attention, neck rotation effector for panning the head for visual attention, and an internal attention selector for attention selection among multiple sensory sources. Other simpler effectors are controlled automatically without awareness of the developmental algorithm, such as the automatic control of aperture, white-balance, and gain of the micro-cameras.

The N-sensors 78 sense a vector of a certain dimensionality from any source, such as a graphic user interface, a rotary dial, a joystick, a file, etc. The N-effector outputs a vector of certain dimensionality to any target, such as a graphic user interface, the screen, a file, etc. It should be appreciated that the above classification of sensors and effectors are based on a major functionality, but such a classification is not unique or unambiguous. For example, pan-tilt head can be considered as an extro-effector or intero-effector.

The computational engines include several parts including the main computer, the arm and neck controller, the drive-base controller, the pan-tilt controls, and several simpler controllers ranging from the micro-camera controllers to the controller for break-out unit for serial ports that interface between the main controller and the devices it controls. Every controller is equipped with one or more processors and memory.

As particularly shown in FIG. 16, the machine shown in the form of a mobile robot includes a camera with real-time center-of-focus, stereo microphones, speakers, a robot manipulator, a mobile base, and positioning system for the eyes and the head. Each of the two cameras is mounted on a pan-tilt head for eye motion. The two pan-tilt heads are mounted on a pan-head for head motion. The machine's sensors shown on the robot include two video cameras with auto-iris lenses, four microphones for learning sound, robot arm gripper, figure-distance sensor, arm overload sensors, collision detection sensors, and more. The effectors shown in FIG. 16 include an arm, speaker, drive system, eye(s), pan-tilt units, head(s), pan unit, vertical sliding base for sliding the arm and head assembly vertically for different heights, and an internal attention system for each of the sensors.

It should be appreciated that the mobile robot shown and described as an example herein is configured with various types of hardware, as may be need for a particular application. The machine is configured with the developmental learning algorithm with the present invention which enables the machine to learn as it acts or performs in its environment. Accordingly, as the mobile robot operates in a given environment over time, the machine is able to learn its environment and to adapt to operate according to the information learned.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A machine having developmental learning capability, said machine comprising:
   one or more sensors for sensing an environment of the machine and generating one or more sensed signals in response thereto;
   one or more effectors for acting on one or more objects in the environment;
   a sensor based level builder having one or more level building elements, said sensor based level builder receiving as an input successive frames of said sensed signals one at a time, and generating action signals each having a relative probability, the sensor based level builder autonomously generating representations of tasks to be learned from said one or more sensed signals; and
   a confidence accumulator for receiving said action signals and accumulating confidence of said action signals based on priority to determine most probable action signals, said confidence accumulator producing action control signals to control said one or more effectors in response to said determined most probable action signals, wherein said machine learns directly from continuous unsegmented sensory streams on-line while performing an operation and learns new tasks of unconstrained domains without a need for reprogramming, and wherein said learned new tasks include tasks that are not predetermined at the time of machine programming, said learned new tasks comprising at least two of autonomous navigation, speech recognition, and object manipulation.

2. The machine as defined in claim 1 further comprising an integration level builder for receiving state outputs from a plurality of said sensor based level builders, said integration level builder performing integration on said state outputs and producing one or more action signals for input to said confidence accumulator.

3. The machine as defined in claim 2, wherein levels in each integration level builder are automatically constructed such that a higher level corresponds to a longer temporal context.

4. The machine as defined in claim 2, wherein said confidence accumulator resolves ambiguity of multiple actions from a plurality of levels using probability normalization and expectation.

5. The machine as defined in claim 2, wherein said integration level builder comprises level building elements each having one or more states, wherein the states in each level building element has a vector representation that is not task-specific.

6. The machine as defined in claim 2, wherein said integration level builder includes higher level building elements that accept state output from lower level building elements that is not task-specific.

7. The machine as defined in claim 1, wherein levels in each sensor based level builder are automatically constructed such that a higher level corresponds to a longer temporal context.

8. The machine as defined in claim 1, wherein said confidence accumulator resolves ambiguity of multiple actions from a plurality of levels using probability normalization and expectation.

9. The machine as defined in claim 1, wherein said sensor based level builder comprises level building elements each having one or more states, wherein the states in each level building element has a vector representation that is not task-specific.

10. The machine as defined in claim 1, wherein said sensor based level builder includes higher level building elements that accept state output from lower level building elements that is not task-specific.

11. The machine as defined in claim 1 further comprising a plurality of sensor based level builders each associated with different ones of said sensors, wherein states in each-level builder have a vector representation that is not task-specific.

12. The machine as defined in claim 1, wherein said machine is capable of learning and performing concurrently.

13. The machine as defined in claim 1 further comprising a signal preprocessor for processing said sensed signals.

14. The machine as defined in claim 1, wherein said learned new tasks comprise at least all of autonomous navigation, speech recognition, and object manipulation.

15. A method of automatically developing learning capability with a machine, said method comprising the steps of:
   sensing an environment with one or more sensors;
   inputting successive frames of signal information into one or more sensor based level builders;

deriving action signals with said one or more sensor based level builders while no action is imposed from the environment, each of said action signals having a relative probability;

autonomously generating representations of tasks to be learned from said sensed environment;

updating memory from continuous unsegmented sensory streams on-line and complying with an action when the action is imposed from the environment, wherein new tasks of unconstrained domains are learned, and new tasks include tasks that are not predetermined at the time of machine programming, said learned new tasks comprising at least two of autonomous navigation, speech recognition, and object manipulation;

inputting said action signals to a confidence accumulator;

determining a most probable action based on said probability of said action signals received by said confidence accumulator; and producing action control signals to control one or more effectors in response to said determined most probable action.

16. The method as defined in claim 15 further comprising the step of recording feedback reward signals from the environment.

17. The method as defined in claim 15 further comprising the step of producing state output signals from said one or more sensor based level builders.

18. The method as defined in claim 17 further comprising the steps of:

integrating a plurality of said state output signals from a plurality of sensor based level builders to produce one or more action signals that depend on multiple sensors; and inputting said one or more action signals with corresponding confidence to said confidence accumulator.

19. The method as defined in claim 15 further comprising the step of computing the most confident action using probability normalization and expectation.

20. The method as defined in claim 15 further comprising the step of automatically forming a hierarchy of y-clusters from continuous vector outputs.

21. The method as defined in claim 20 further comprising the step of forming a hierarchy of x-clusters from said y-clusters.

22. The method as defined in claim 15 further comprising the step of deleting elements that are not visited often as defined by a memory trace update.

23. The method as defined in claim 15, wherein said machine is capable of leaning and performing concurrently.

24. The method as defined in claim 15, wherein said machine forms new states recursively from previous states using any one or more of uniform and non-uniform resolution reduction and resolution retention.

25. The method as defined in claim 15, wherein said machine forms new states as context of certain temporal extent, thus enabling the machine to learn directly from continuous unsegmented, sensory input streams.

26. The method as defined in claim 15, wherein said machine allows external action imposition and reward to be applied at any time, thus enabling learning and performance to occur in an arbitrary order and to occur concurrently.

27. The method as defined in claim 15, wherein said machine performs action-imposed learning in developmental learning.

28. The method as defined in claim 15, wherein said machine performs reinforcement learning in developmental learning.

29. The method as defined in claim 15, wherein said machine performs communicative learning in developmental learning.

30. The method as defined in claim 15, wherein said learned new tasks comprise at least all of autonomous navigation, speech recognition, and object manipulation.

* * * * *

UNITED STATES PATENT AND TRADEMARK OFFICE
CERTIFICATE OF CORRECTION

PATENT NO.   : 6,353,814 B1
DATED        : March 5, 2002
INVENTOR(S)  : Juyang Weng It is certified that error appears in the above-identified patent and that said Letters Patent is hereby corrected as shown below:

Column 4,
Line 29, "Developing" should be -- Developmental --.
Lines 36 and 37, "programmiing" should be -- programming --.

Column 5,
Line 32, "Developing" should be -- Developmental --.

Column 6,
Line 64, "(I) Agent M" should be -- (III) Agent M --.

Column 8,
Line 19, "sensor-edicated" should be -- sensor-dedicated --.

Column 9,
Line 21, "b(it)" should be -- b(t) --.

Column 10,
Line 40, "tine t=0" should be -- time t=0 --.

Column 11,
Line 2, "a formed space" should be -- a normed space --.
Line 2, second occurrence; "formed" should be -- normed --.

Column 12,
Line 48, "so): a(j+1)=a(j)." should be -- s(j): a(t+1)=a(j). --.

Column 14,
Line 43, "period T," should be -- period $T_i$ --.
Line 61, "state so)." should be -- state s(j). --.

UNITED STATES PATENT AND TRADEMARK OFFICE
CERTIFICATE OF CORRECTION

PATENT NO. : 6,353,814 B1
DATED : March 5, 2002
INVENTOR(S) : Juyang Weng

It is certified that error appears in the above-identified patent and that said Letters Patent is hereby corrected as shown below:

Column 16,
Line 45, "leaned" should be -- learned --.

Column 17,
Line 49, "Xx$_n$" should be -- x$_n$ --.

Column 18,
Line 28, after "(Eq. 9)" insert on the next line -- for n>1. --.

Column 19,
Line 23, "samples (x$_1$, y$_1$)" should be -- (x$_I$, y$_I$) --.
Line 23, where y$_1$=h(x$_1$)" should be -- where y$_I$=h(x$_i$) --.
Line 24, "output y$_1$" should be -- output y$_I$ --.
Line 29, "If y$_1$" should be -- If y$_I$ --.
Line 65, "(q-1 discriminate space." should be -- (q-1)-dimensional discrimante space. --.

Column 20,
Line 3, delete "clusters".
Line 16, "tie" should be -- the --.
Line 24, "Nusing" should be -- N using --.
Line 55, "fer" should be -- further --.

Column 22,
Line 22,

"C={c$_1$, c$_{22}$,..., c$_q$|c$_i$ ∈ X$_I$=1, 2,..., q}." should be

--C={c$_1$, c$_2$,..., c$_q$|c$_i$ ∈X$_I$=1, 2,..., q}.--.

Column 24,
Line 14,

" $d(x,c_i) = v^T \Gamma_{i-1} v = v^T (LL^T)^{-1} v = (L^{-1}v)^T (L^{-1}v).$ " should be -- $d(x,c_i) = v^T \Gamma_i^{-1} v = v^T (LL^T)^{-1} v = (L^{-1}v)^T (L^{-1}v).$ --.

UNITED STATES PATENT AND TRADEMARK OFFICE
CERTIFICATE OF CORRECTION

PATENT NO. : 6,353,814 B1
DATED : March 5, 2002
INVENTOR(S) : Juyang Weng

It is certified that error appears in the above-identified patent and that said Letters Patent is hereby corrected as shown below:

Column 26,
Line 22, "nmning" should be -- running --.

Signed and Sealed this

Tenth Day of September, 2002

Attest:

JAMES E. ROGAN
Attesting Officer  Director of the United States Patent and Trademark Office